United States Patent
Neuenschwander

[19]
[11] Patent Number: 6,131,268
[45] Date of Patent: *Oct. 17, 2000

[54] METHOD FOR MANUFACTURING A LAMINA STACK HAVING AT LEAST TWO DIFFERENTLY SHAPED LAMINA LAYERS

[75] Inventor: Thomas R. Neuenschwander, Fort Wayne, Ind.

[73] Assignee: L. H. Carbide Corporation, Fort Wayne, Ind.

[*] Notice: This patent is subject to a terminal disclaimer.

[21] Appl. No.: 08/963,795

[22] Filed: Nov. 4, 1997

Related U.S. Application Data

[60] Division of application No. 08/806,020, Feb. 24, 1997, Pat. No. 5,755,023, which is a continuation-in-part of application No. 08/658,595, Jun. 5, 1996, Pat. No. 5,799,387.

[51] Int. Cl.[7] .................................................. H02K 15/00
[52] U.S. Cl. ................................ 29/596; 29/609; 29/738; 310/217; 336/217
[58] Field of Search .............................. 29/596, 609, 738, 29/732, 598; 310/217, 218, 259, 216; 336/216, 217, 232

[56] References Cited

U.S. PATENT DOCUMENTS

| | | | |
|---|---|---|---|
| 2,576,328 | 11/1951 | Allison | 164/104 |
| 2,671,951 | 3/1954 | Sliwiak | 29/155.61 |
| 2,975,312 | 3/1961 | Ploran | 310/217 |
| 3,202,851 | 8/1965 | Zimmerle et al. | 310/259 |
| 3,203,077 | 8/1965 | Zimmerle | 29/155.5 |
| 3,512,435 | 5/1970 | Bossmann | 83/71 |
| 3,524,370 | 8/1970 | Thompson | 83/685 |

(List continued on next page.)

FOREIGN PATENT DOCUMENTS

| | | |
|---|---|---|
| 0 084568 | 6/1983 | European Pat. Off. . |
| 0655825A | 5/1995 | European Pat. Off. . |
| 0 738 831 A2 | 10/1996 | European Pat. Off. . |
| 2017379 | 10/1971 | Germany . |
| 26 31 188 | 1/1978 | Germany . |
| 27 51 123 | 5/1979 | Germany . |
| 56-107764 | 8/1981 | Japan . |
| 56-129556 | 10/1981 | Japan . |
| 58-66557 | 4/1983 | Japan . |
| 0622508A | 1/1994 | Japan . |
| 06090550A | 3/1994 | Japan . |
| 2206453A | 1/1989 | United Kingdom ............ H01F 27/24 |

OTHER PUBLICATIONS

Computer Numerical Control of Production of Rotor and Stator Lamination Segments for Large Electrical Generators and Motors, Arthur Silverton, Metalworking '82.

*Primary Examiner*—Lee Young
*Assistant Examiner*—Minh Trinh
*Attorney, Agent, or Firm*—Baker & Daniels

[57] ABSTRACT

A laminated stack having a lamina layer comprised of a plurality of discrete lamina segments and which may also have laminas which define a plurality of outer perimeter configurations. The invention provides a method and apparatus for manufacturing such stacks. Lamina layers comprising a plurality of discrete lamina segments are automatically stacked by positioning the uppermost lamina in a choke barrel near the lower die bed surface and engaging the interlock tabs of the discrete lamina segments with the interlock slots of an uppermost lamina layer in the choke barrel prior to the complete separation of the discrete lamina segments from the remaining portion of the strip stock material. Each of the outer perimeter configurations has at least one common choke surface. The common choke surfaces form, when the laminas are stacked, a choke contacting surface on the outer perimeter surface of the lamina stack which extends continuously in the axial direction from the top lamina to the bottom lamina A die assembly having selectively actuated punches is used to stamp the laminas with a plurality of outer perimeter configurations and the laminas are stacked in a choke barrel with an alignment surface which cooperates with the common choke surface and securely holds the stamped laminas in position while the stack is being formed. Rotation of the choke barrel compensates for strip thickness variations.

14 Claims, 16 Drawing Sheets

U.S. PATENT DOCUMENTS

| Patent # | Date | Inventor | Class |
|---|---|---|---|
| 3,590,208 | 6/1971 | Martini et al. | 219/92 |
| 3,606,674 | 9/1971 | Givan . | |
| 3,738,569 | 6/1973 | Killaly, Sr. | 234/43 |
| 3,783,318 | 1/1974 | Widstrand | 310/216 |
| 3,802,068 | 4/1974 | Scott | 29/598 |
| 3,823,460 | 7/1974 | Bergmann | 29/203 |
| 3,834,013 | 9/1974 | Gerstle . | |
| 3,840,983 | 10/1974 | Ryff | 29/598 |
| 4,110,895 | 9/1978 | Mitsui | 29/564.2 |
| 4,149,309 | 4/1979 | Mitsui . | |
| 4,160,182 | 7/1979 | Mitsui | 310/214 |
| 4,162,734 | 7/1979 | Danglemaier | 29/433 |
| 4,264,663 | 4/1981 | Beenken | 428/132 |
| 4,272,579 | 6/1981 | Mitsui | 428/133 |
| 4,364,169 | 12/1982 | Kawano et al. | 29/596 |
| 4,383,356 | 5/1983 | Fichtner | 29/598 |
| 4,445,272 | 5/1984 | Bruhn et al. | 29/598 |
| 4,464,826 | 8/1984 | Bair . | |
| 4,538,345 | 9/1985 | Diederichs | 29/596 |
| 4,597,168 | 7/1986 | Oboshi et al. | 29/596 |
| 4,619,028 | 10/1986 | Neuenschwander | 29/33 |
| 4,728,842 | 3/1988 | Martin | 310/217 |
| 4,736,516 | 4/1988 | Pfaffenzeller et al. . | |
| 4,738,020 | 4/1988 | Neuenschwander | 29/598 |
| 4,827,237 | 5/1989 | Blackburn | 336/210 |
| 4,888,866 | 12/1989 | Hansen . | |
| 4,897,916 | 2/1990 | Blackburn | 29/609 |
| 4,900,636 | 2/1990 | Takenouchi et al. | 336/217 |
| 4,918,832 | 4/1990 | Tokumasu et al. | 29/606 |
| 4,979,285 | 12/1990 | Martin | 29/598 |
| 5,075,150 | 12/1991 | Webb et al. | 430/162 |
| 5,087,849 | 2/1992 | Neuenschwander | 29/598 |
| 5,123,155 | 6/1992 | Neuenschwander | 29/596 |
| 5,265,320 | 11/1993 | Greenway | 29/596 |
| 5,338,996 | 8/1994 | Yamamoto | 310/217 |
| 5,349,740 | 9/1994 | Neuenschwander | 29/596 |
| 5,359,763 | 11/1994 | Neuenschwander | 29/738 |
| 5,373,622 | 12/1994 | Neuenschwander | 29/596 |
| 5,377,115 | 12/1994 | Neuenschwander | 364/468 |
| 5,406,243 | 4/1995 | Jenkins | 336/217 |
| 5,632,259 | 5/1997 | Konda et al. | 123/634 |
| 5,703,559 | 12/1997 | Emmerich et al. | 336/234 |
| 5,755,023 | 5/1998 | Neuenschwander et al. | 29/596 |
| 5,799,387 | 9/1998 | Neuenschwander et al. | 29/598 |
| 5,826,323 | 10/1998 | Walters | 29/593 |

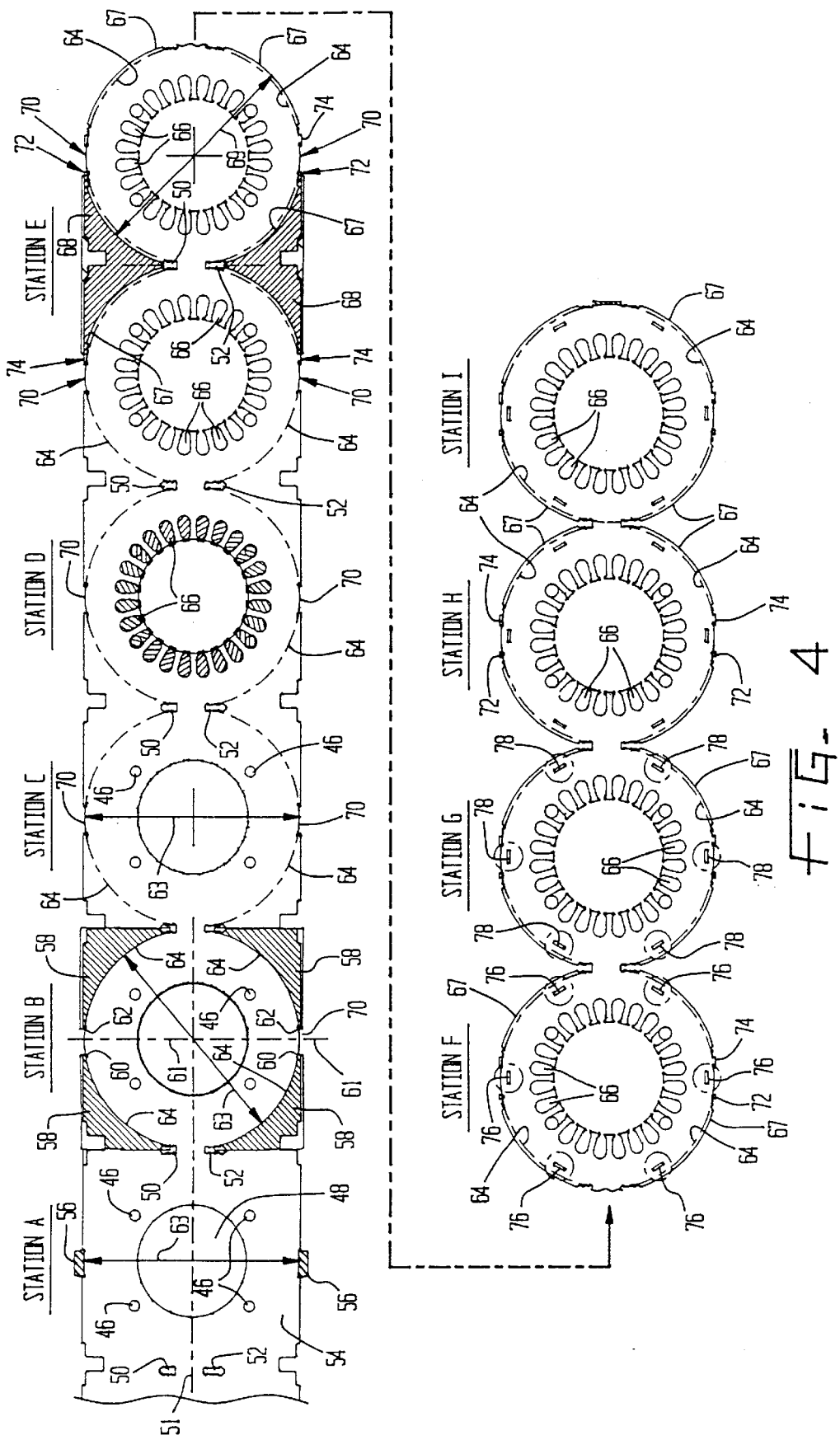

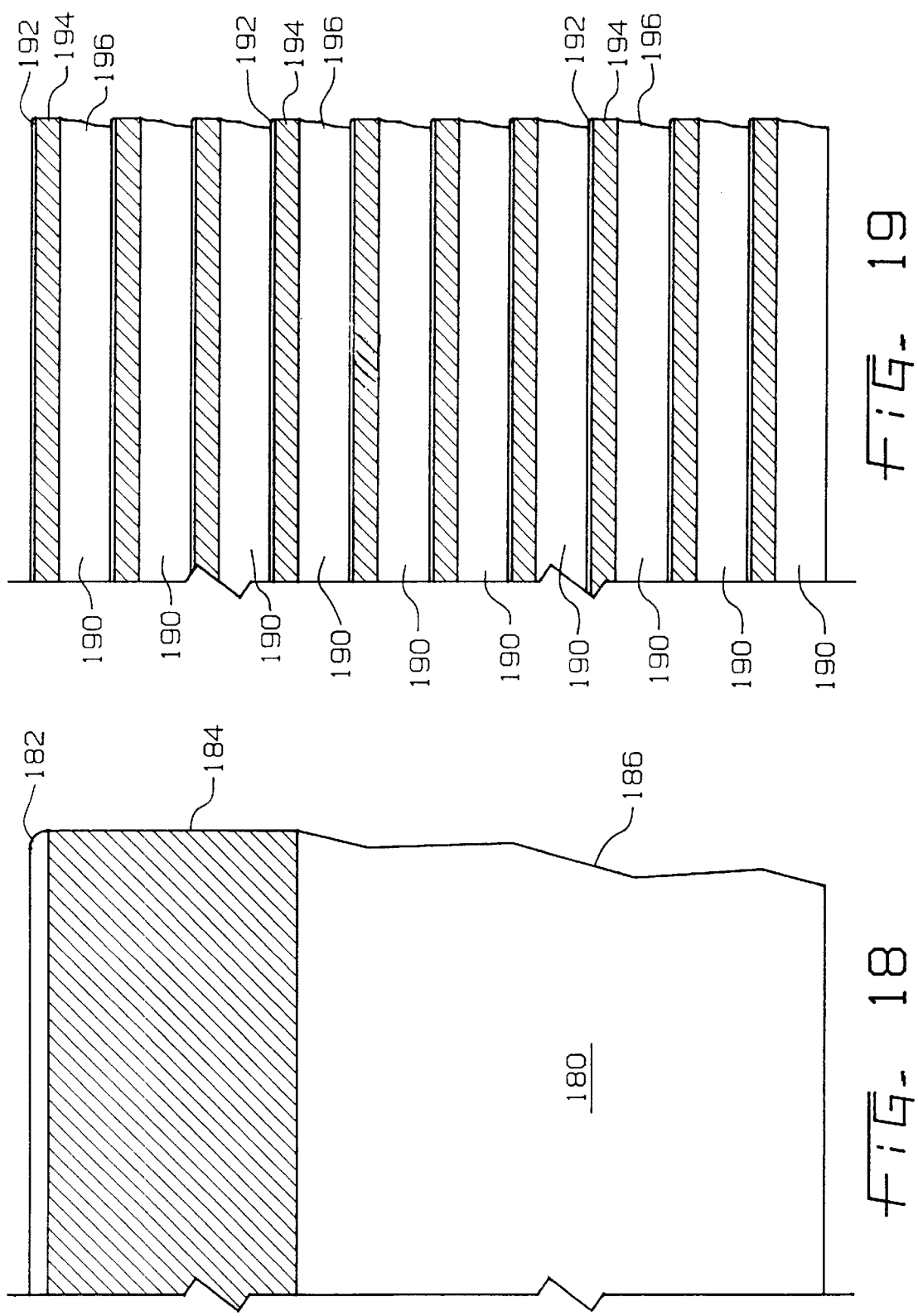

METHOD FOR MANUFACTURING A LAMINA STACK HAVING AT LEAST TWO DIFFERENTLY SHAPED LAMINA LAYERS

This is a division of U.S. Pat. No. 5,755,023 entitled LAMINA STACK WITH AT LEAST ONE LAMINA LAYER HAVING A PLURALITY OF DISCRETE SEGMENTS AND AN APPARATUS AND METHOD FOR MANUFACTURING SAID STACK application Ser. No. 08/806,020, filed on Feb. 24, 1997, which is a continuation-in-part of application Ser. No. 08/658,595 U.S. Pat. No. 5,799,387 entitled LAMINA STACK HAVING A PLURALITY OF OUTER PERIMETER CONFIGURATIONS AND AN APPARATUS AND METHOD FOR MANUFACTURING SAID STACK filed on Jun. 5, 1996.

BACKGROUND OF THE INVENTION

1. Field of the Invention

The present invention relates generally to laminated parts. More particularly, the present invention relates to lamination stacks formed by stamping a plurality of lamination layers from a sheet of stock material and the methods and apparatus, i.e., progressive dies, used in the manufacture of such laminated parts.

2. Description of the Related Art

The manufacture of parts, e.g., stators and rotors for electric motors, employing stacked laminas is well known in the art. Typically, the laminas are blanked from a continuous strip stock and then stacked and bound together to form the completed part. Progressive die assemblies for producing laminated stacks wherein a strip of lamination material is fed through a sequence of punching steps to progressively form the laminas to the desired end configuration are also well known.

It is also known to form, in the laminas, interlock tabs which extend below the generally planar lamina surface and engage slots formed in the next lower lamina. In this manner, a plurality of laminas may be stamped from a single sheet of strip stock and formed into an interconnected lamina stack in the die by means of interlocking tabs and slots. More specifically, to form an interconnected lamina stack each lamina, except the bottom lamina of the stack, may have a plurality of arcuately spaced interlock tabs (typically ranging from 3 to 8 circumferentially disposed tabs) depressed from the lamina lower surface adjacent to slots formed in the next lower lamina. Each interlock tab engages a corresponding slot in the next lower lamina of the stack, generally by the entire thickness of the tab. The bottom lamina of the stack may have the interlock tabs blanked and removed to avoid interlocking the bottom lamina with the next lower lamina which forms the top lamina of the previous stack. In rare instances the tab may lock as deeply as two lamina thicknesses, in which case two end laminations must be blanked.

Rotor laminas generally include a plurality of skewed conductor slots which are formed around the periphery of the rotor stack in arcuately spaced relation to one another by rotationally indexing the laminas with respect to the rotor stack. Indexing involves rotating the rotor stack and the last produced lamina relative to each other by a predetermined rotational increment so that, when the laminas are combined in a stack, the rotor conductor bar slot defined by adjacent conductor slots are skewed or slanted relative to the stack axis. Stator stacks, on the other hand, include winding slots around the inner periphery of the stack which extend parallel to the stack axis, without skew, and are shaped to receive the stator windings. In some circumstances, however, it may be desired to build an "inside-out" motor wherein the outer lamination stack forms the rotor and would, thus, require skewed slots.

Another system of forming a stack involves loosely stacking the laminas as they are formed and blanked from the stock material in a progressive die assembly. After all the laminas for a given stack are collected, they are shuttled to a pressing station and the laminas are pressed together to engage the interlock tabs and thereby form the lamina stack. Loosely stacking the laminas after they are blanked from strip stock has several disadvantages; loose stacking and subsequent pressing does not as consistently lock adjacent laminas together; the required handling slows production times; and the system lacks a means for automatically correcting thickness inconsistencies of the stock material or creating a desired skew angle for the conductor slots. A similar process can be employed without the use of interlocking features on the laminas. Assembly of the non-interlocked laminas requires the welding, keying or riveting (or pinning) of the laminas to interconnect the laminas in a stack.

In response to these problems, an autorotation system for compensating for the nonuniform stock thickness was developed which both rotates and interlocks the stacked laminas. This system compensates for variations in lamina thickness while still properly skewing the conductor slots of rotor laminas, as described in U.S. Pat. Nos. 4,619,028; 4,738,020; 5,087,849 and 5,123,155, all assigned to the assignee of the present invention and the disclosures of which are incorporated herein by reference. In the system disclosed in the aforementioned patents, the choke barrel holding the lamination stack is automatically rotated before each lamina is blanked from the strip stock and the lamina's circumferentially disposed tabs are interlocked with the slots of the uppermost lamina of the incomplete lamination stack within the barrel.

In the apparatus and method disclosed in the aforementioned patents, the individual laminas are typically rotated through an angle of 180°. Although the laminas may be rotated through other angles, the angle must be at least 360°/(number of interlock tabs) so that the interlocking tabs and slots are properly aligned.

The above described improvements have been implemented with rotor laminations and stator laminations which have identical outer perimeters which enables their insertion into a choke barrel designed to hold a lamination having the outer perimeter configuration of the laminations being stacked. Many of these improvements require the use of interlock tabs in combination with autorotation of a partially formed lamina stack.

Autorotation requires the use of a rotating choke barrel which firmly holds the partially formed lamina stack in position as blanked laminas are forced into engagement with the uppermost lamina of the stack. The choke barrel is typically configured to match the outer perimeter of the blanked lamina and may be slightly undersized, e.g., by 0.001 inch, so that the laminas will be firmly held and accurately positioned within the choke barrel. The laminas located in the choke barrel thereby provide a back pressure or resistance which facilitates the entry of the interlock tabs of the next lamina when it is pressed into the choke barrel.

In certain applications, however, it is desirable to have a lamination stack, typically a stator core but also rotor cores in some situations, wherein some of the laminations have an outside perimeter which differs in shape and/or size from the remainder of the stack of laminations, i.e., the laminations in the stack have a plurality of distinguishable configurations. For example, the stator core may incorporate a fastening feature, such as a projecting flange, to provide a mounting surface which is integral with the stator core, or the stator may incorporate a sealing feature to provide a seal between the housing of the motor and the stator core for motors to be used in environments which include flammable vapors. To incorporate such features, a fraction of the laminations in a stack are manufactured with integral portions which provide such features.

Traditionally, the manner in which stator cores having a plurality of outer perimeter configurations have been produced is to stamp the differently configured laminas in separate dies, i.e., each die provides only a single lamina configuration. The plurality of dies produce loose laminations having the desired plurality of outer perimeter configurations. The laminations must then be manually assembled at a station where laminations of the different outer perimeter configurations are placed in the proper vertical stack arrangement and are pressed together to interlock the laminas. Instead of using interlocking tabs, the laminas may also be secured together in some other conventional fashion such as by the use of clamps, pins, rivets or welds.

There are several drawbacks to this manner of manufacturing a lamination core having laminations with a plurality of outer perimeter configurations. For one, the manufacturing process is relatively expensive due to the use of multiple dies and the large amount of labor and handling which is required. Additionally, the process does not allow for the automatic correction of lamina thickness inconsistencies.

Another problem with this method of manufacture is that it often produces stator cores having winding slots with slight discontinuities and sharp edges. Because separate dies are used to form the differently configured laminas, the stator winding slots are punched by different dies. Although similar in shape, the different punches cannot be precisely identical and will generally have minor inconsistencies which, when the differing laminas are stacked, cause the slots in adjacent laminations to misalign, thereby creating slight discontinuities and sharp edges in the winding slots at the points where the two differently configured laminas meet. These small discontinuities can scratch and damage the winding coil wires which are inserted into the winding slots.

The discontinuities of the projections which define the winding slots and interior surface of the stator core also reduce the efficiency of the electric motor or generator which is produced with the stator core. The efficiency of the motor or generator may be reduced if the gap between the stator core and rotor core is enlarged to account for the discontinuities present on the interior surfaces of the stator core because the efficiency of the motor or generator is decreased as the gap increases.

The manufacture of lamina stacks wherein individual laminas are comprised of two or more discrete segments also presents significant manufacturing difficulties. It is often impractical to manufacture lamina stacks wherein one or more of the laminas is formed by at least two discrete lamina segments. Laminas comprised of a plurality of discrete segments present difficulties in maintaining the proper alignment between the various lamina segments which comprise the individual lamina and between the lamina segments and the other laminas which comprise the remainder of the lamina stack.

Thus, what is needed is an apparatus and method for producing lamina stacks which include laminas comprised of a plurality of discrete lamina segments and laminas with a plurality of differently configured outer perimeters.

SUMMARY OF THE INVENTION

The present invention provides an apparatus and method for manufacturing and automatically stacking a laminated stack which includes a lamina comprised of a plurality of discrete lamina segments and which may include a plurality of differently configured laminas to thereby produce lamina stacks which may include a plurality of slots and windows separating individual lamina segments.

An advantage of the present invention is that it permits the automatic stacking of a laminated stack which includes a lamina layer comprised of discrete lamina segments thereby providing for the economical manufacture of lamina stacks which include a lamina or lamina layer comprising a plurality of discrete lamina segments. For example, linear motors which require stator cores having slots on opposing sides of the core for accommodating supports for an actuator disposed within the stator core may be economically manufactured by the present invention. The ability to automatically stack a lamina comprised of discrete lamina segments also permits the manufacture of a wide variety of laminated stacks for applications beyond electrical motor and stator cores which are uneconomical or impractical to manufacture using laminated stacks which do not include laminas comprising discrete lamina segments.

Another advantage of the present invention is that the economical manufacture of laminated stacks comprising a lamina layer of discrete lamina segments permits the manufacture of parts which were previously stamped from a single thick sheet material. Manufacturing parts from laminas rather than from a single thick sheet material can eliminate secondary operations. For example, notches can be placed in selected laminas prior to stacking to thereby form a notch or opening in the outside edge or wall of the laminated stack which does not extend the entire height of the stack and which, if formed in a part stamped from a single thick sheet material, would require a secondary machining operation after stamping.

Yet another advantage of the present invention is that it permits the automatic stacking of a laminated stack having a plurality of distinguishable outer perimeter configurations. The need to manually handle and stack laminas to form a lamina stack having a plurality of outer perimeter configurations and/or a lamina layer comprising a plurality of discrete segments is thereby eliminated. The conveyor, pressing and stack securing equipment used in the traditional manual assembly method are also eliminated by the present invention.

The invention comprises, in one form thereof, a die assembly for producing a lamina stack including at least one lamina layer which is comprised of a plurality of discrete segments. Strip stock is guided through the die assembly and a plurality of laminas and discrete lamina segments are progressively stamped from the strip stock. The laminas and each of the discrete lamina segments have interlock tabs and/or slots punched therein and remain attached to the strip stock prior to advancement to the blanking station at which the choke barrel is located. At the blanking station, the lamina segments have their interlock tabs engaged with the interlock slots of the uppermost lamina in the choke barrel immediately prior to the complete separation of the lamina segments from the strip stock material thereby maintaining the lamina segments in proper alignment with each other and the laminas which form the remainder of the lamina stack. The choke barrel may also be rotatable whereby the laminas may be rotated to correct for thickness inconsistencies in the strip stock material.

The invention comprises, in another form thereof, a die assembly for producing a lamina stack including at least one lamina which is comprised of a plurality of lamina segments and wherein the laminas forming the stack have more than one predetermined outer perimeter configuration. The die assembly provides for the alignment, interlocking and stacking of the lamina segments as described above and also provides a common choke surface on the outer perimeter of each of the lamina segments so that, when the lamina stack is completed, the resultant stack comprising lamination layers having a plurality of outer perimeters has a plurality of common choke surfaces on its outer perimeter which extend continuously along the exterior edge of each lamination layer in the stack in a direction parallel to the axis of the lamina stack. The laminas are stacked within the choke barrel such that the common choke surfaces are in registry with an alignment surface of the choke barrel.

The invention comprises, in another form thereof, a selectively actuated die assembly for producing a lamina stack formed from laminas which have more than one predetermined outer perimeter configuration. Each of the differing outer perimeter configurations has at least one common choke surface so that, when the laminas are stacked, the resultant stack has at least one choke surface on its outer perimeter which extends continuously along the exterior edge of each lamina in the stack in a direction parallel to the axis of the lamina stack. The laminas are then stacked in a choke barrel with their common choke surfaces being aligned to create a lamina stack comprised of laminas having a plurality of outer perimeters and at least one choke surface extending continuously in an axial direction across a portion of the outer perimeter of each of the laminas. The choke barrel, which may be rotatable, includes an alignment surface, the common choke surfaces of the laminas being stacked in registry with the alignment surface.

The invention comprises, in another form thereof, a method of manufacturing a lamina stack, having at least one lamina layer formed from a plurality of discrete segments, in a die assembly having a punch and a choke barrel. Strip stock is guided through the die assembly and a plurality of laminas are stamped from the strip stock including at least one lamina which is comprised of at least two discrete segments. The lamina segments are maintained in relative alignment by attachment to the strip stock material as they are advanced through the die assembly. During progression of the discrete segments through the die assembly interlock tabs and slots are stamped into each of the lamina segments. When the lamina segments reach the choke barrel, the interlock tabs of each of the lamina segments are engaged with the uppermost lamina in the choke barrel prior to separating the discrete segments from the strip stock to thereby continuously maintain the proper alignment of the lamina segments relative to each other and the other laminas which form the remainder of the lamina stack.

The invention comprises, in another form thereof, a method of manufacturing a lamina stack in a die assembly having a selectively actuated punch and a choke barrel. Strip stock is guided through the die assembly and a plurality of laminas are stamped from the strip stock by the selectively actuated punch to form laminas having a plurality of outer perimeter configurations. The laminas each have a common choke surface which are aligned as the laminas are formed into a stack in the choke barrel. It is also possible to autorotate the laminas prior to stacking the laminas.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 4 is a plan view of a second strip layout for producing a stator core having a plurality of distinguishable outer perimeter configurations.

FIG. 18 is a schematic view of the sheared edge of a thick material.

FIG. 19 is a schematic view of the sheared edges of a plurality of laminas forming a laminated stack.

Figure 1:
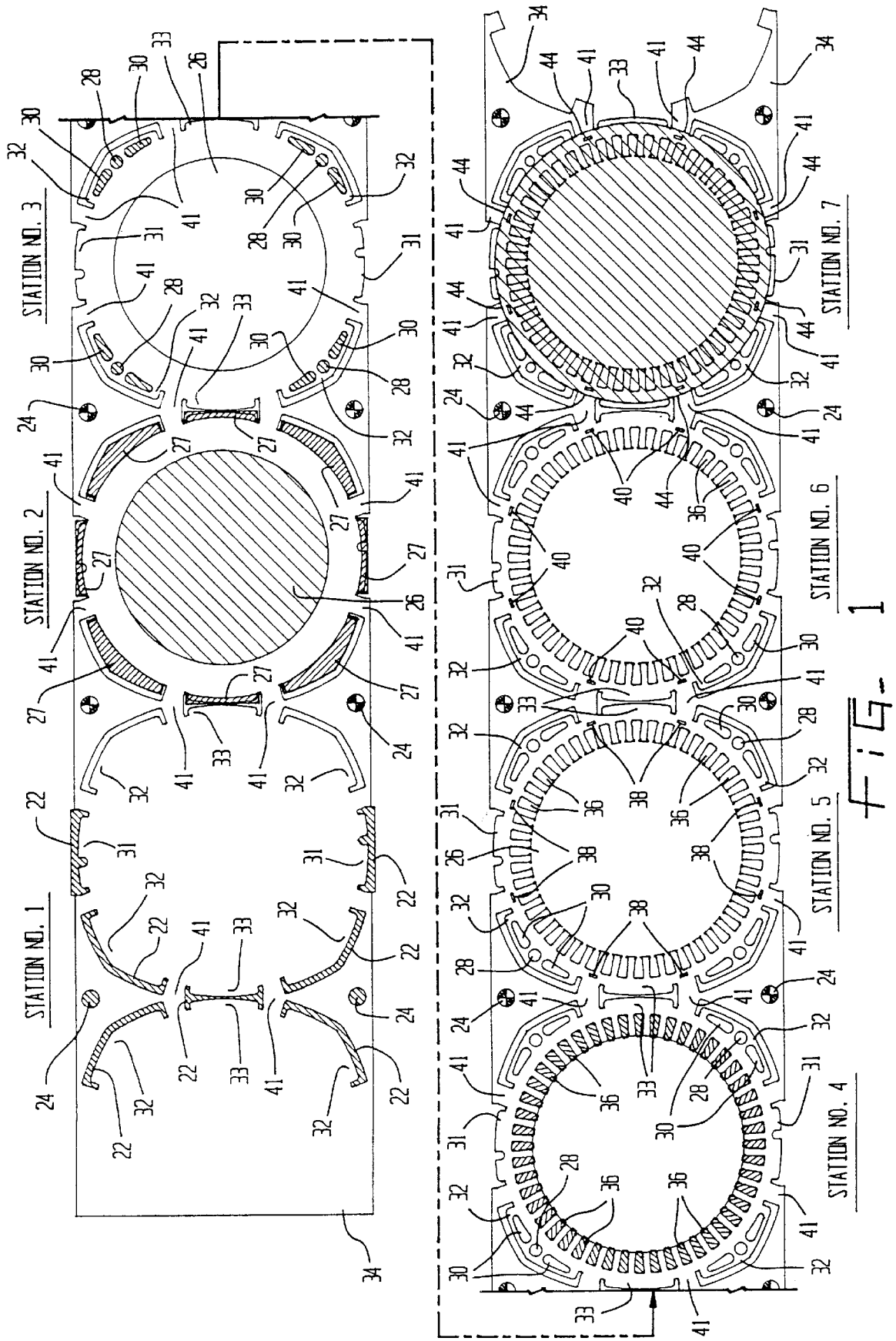
FIG. 1 is a plan view of a strip layout for producing a stator core having laminas with a plurality of distinguishable outer perimeter configurations.

Corresponding reference characters indicate corresponding parts throughout the several views. Although the drawings represent the preferred embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description.

Figure 2:
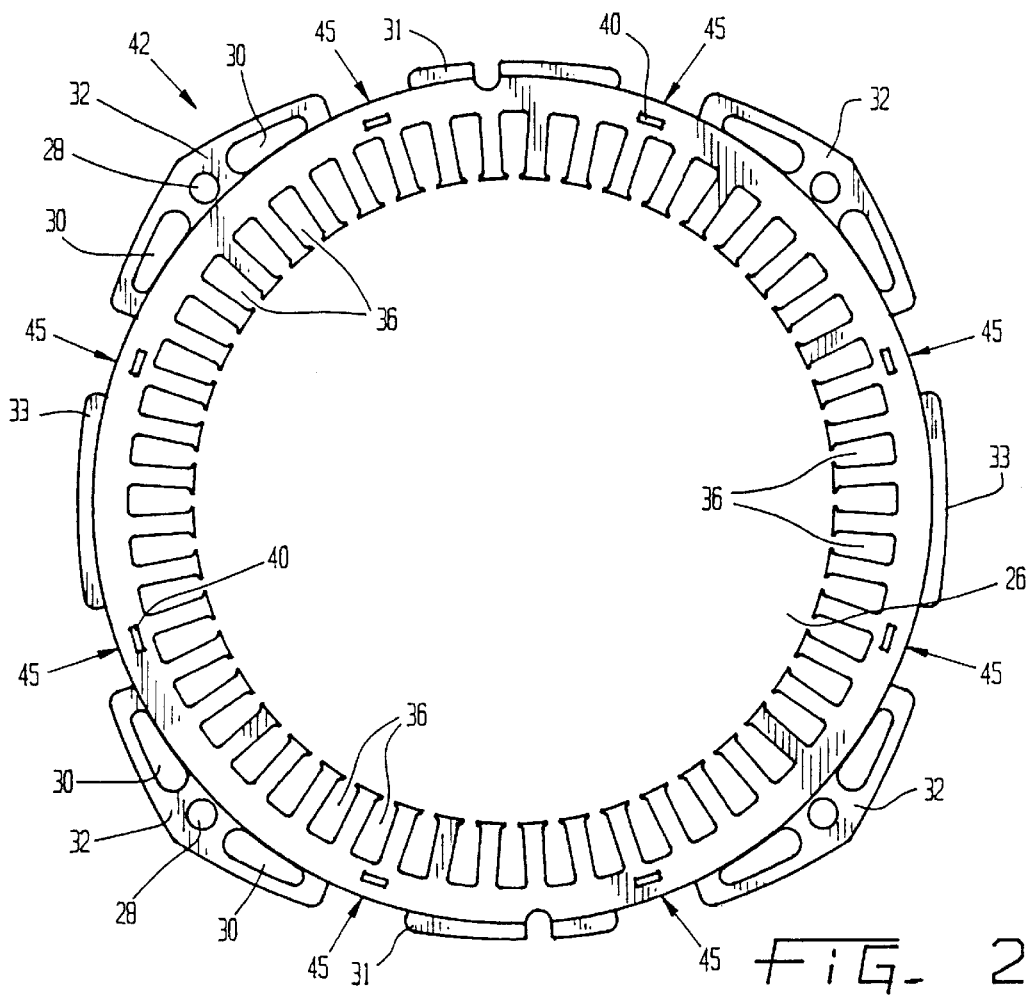
FIG. 2 is a plan view of the stator core created by stacking the laminas produced by the strip layout of FIG. 1.
Figure 3:
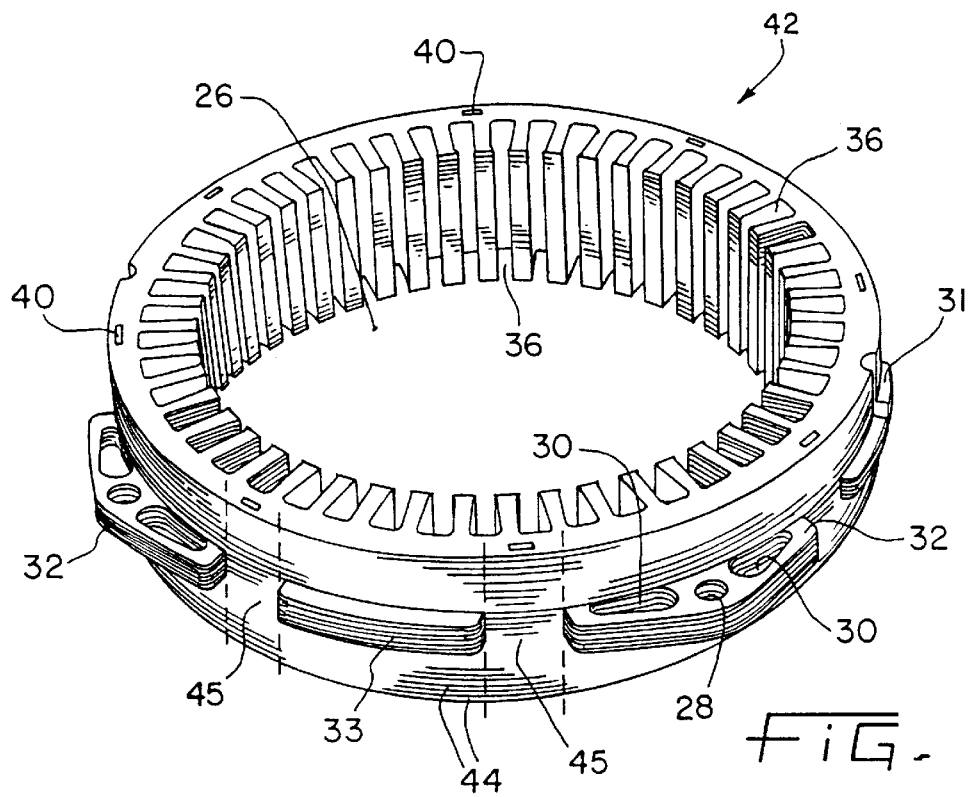
FIG. 3 is a perspective view of the stator core of FIG. 2.

A strip layout showing a stamping progression in accordance with the present invention is shown in FIG. 1. The laminations produced by the strip layout of FIG. 1 are used to produce a stator core having projecting flanges on only some of the laminations within each stator core as shown in FIGS. 2 and 3.

At Station No. 1, slots 22 which define the outer perimeter of projecting flanges for two adjacent laminations are punched. Pilot pin holes 24 used to guide and align the strip stock 34 through subsequent stations are also punched at Station No. 1. Flange defining slots 22 are punched for each lamination, even for those laminations which will have the flanges selectively removed at a later station.

Station No. 2 includes a selectively actuated punch which punches the stator bore hole 26 in each lamination. In most cases, this station would comprise either a rotor blank out punch or stator bore hole shave punch. The flanges 31, 32 and 33 defined by slots 22 are selectively removed from some of the laminations at Station No. 2 as shown by outline 27 of the selectively actuated flange removal punches.

At Station No. 3 flange bolt holes 28 and flange slots 30 are punched. The strip stock is shown with flanges 31, 32 and 33 at Station Nos. 3–7, however, for laminations which do not have flanges 31, 32 and 33 due to the actuation of the flange removal punches at Station No. 2, the material comprising the flanges would not be present. Thus, the punches at Station No. 3 do not have to be selectively actuated. By limiting the use of selectively actuated dies to only those situations where they are indispensable the cost of the die assembly is minimized.

The stator winding slots 36 for all of the laminations are punched at Station No. 4. The use of a single punch cluster at Station No. 4 to stamp the winding slots 36 for each of the laminations produces a winding slot in the finished stator core 42 which has fewer discontinuities and sharp edges than a stator core comprised of laminations produced by a plurality of dies.

Station No. 5 is a selectively actuated punch station which is actuated for the bottom lamination of each stator stack. The material 38 removed at Station No. 5 would otherwise be formed into an interlock tab 40 at Station No. 6. The punches at Station No. 6 do not have to be selectively actuated because if the punches are always operative they would simply not create any additional interlock features in the bottom laminations formed at Station No. 5.

At Station 7, all of the laminations are blanked from the remaining strip stock 34 by severing the material bridges 41 and are pressed into a choke barrel. It is not necessary for the punch to engage the entire surface area of flanges 31, 32 and 33. For the present embodiment the choke barrel is nonrotatable, however, as will be described below, the choke barrel utilized in the present invention may also be rotatable. The material bridges 41 are cut at the same location on both the flanged and unflanged laminas, thereby creating common choke surfaces 44, as shown in FIGS. 1 and 3, on the edge of each lamina.

The choke barrel (shown schematically in FIG. 11) into which the laminas are pressed has alignment surfaces which correspond with and engage each of the common choke surfaces 44. The alignment surfaces define an outer perimeter which is equal to or slightly less, e.g., by 0.001 inch, than the outer perimeter defined by the common choke surfaces 44 to thereby provide an interference fit engagement with the laminas. This interference fit engagement of each of the laminas maintains the laminas in an aligned position and also resists the movement of the laminations through the choke barrel. This allows subsequent laminations to be pressed into interlocked engagement with the laminas already in the choke barrel.

When the stack has been completed, the individual common choke surfaces 44 of each lamination form a stack choke surface 45, shown in FIG. 3, which extends continuously in an axial direction of the stack across a portion of the outer perimeter of each of the laminas which comprise the stack.

A flanged stator core 42 produced by the laminations punched from the strip stock 34 of FIG. 1 is shown in FIGS. 2 and 3. A controller is used to selectively actuate the punches at Stations 2 and 5. By actuating the punches of Station Nos. 2 and 5 in a controlled sequence, laminations may be produced in the order necessary to form flanged stator core 42.

Figure 5:
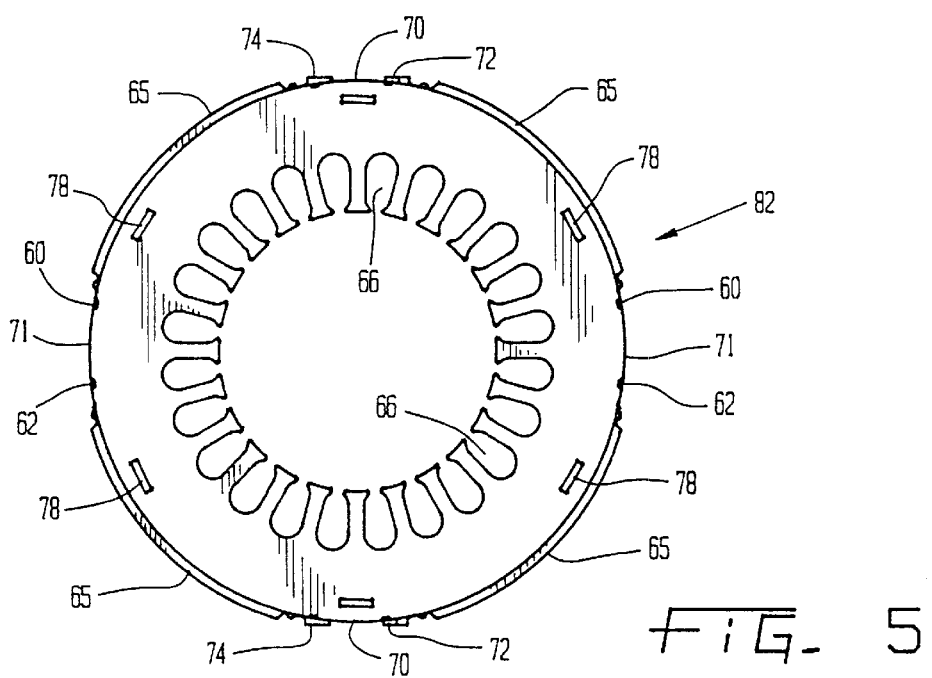
FIG. 5 is a plan view of the stator core produced by stacking the laminas produced by the strip layout of FIG. 4.
Figure 4A:
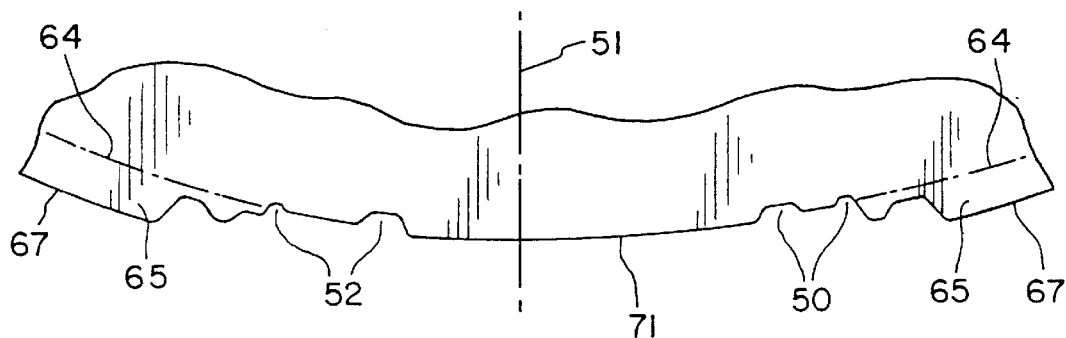
FIG. 4A is an enlarged partial plan view of detail 4A of FIG. 4.
Figure 4B:
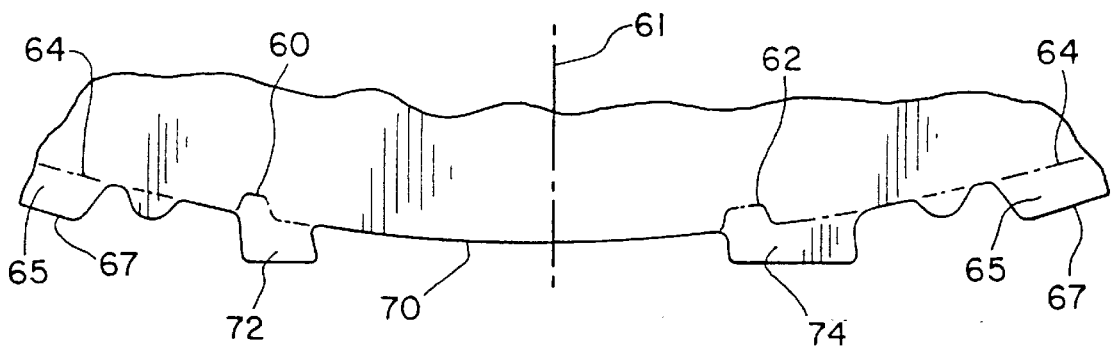
FIG. 4B is an enlarged partial plan view of detail 4B of FIG. 4.
Figure 6:
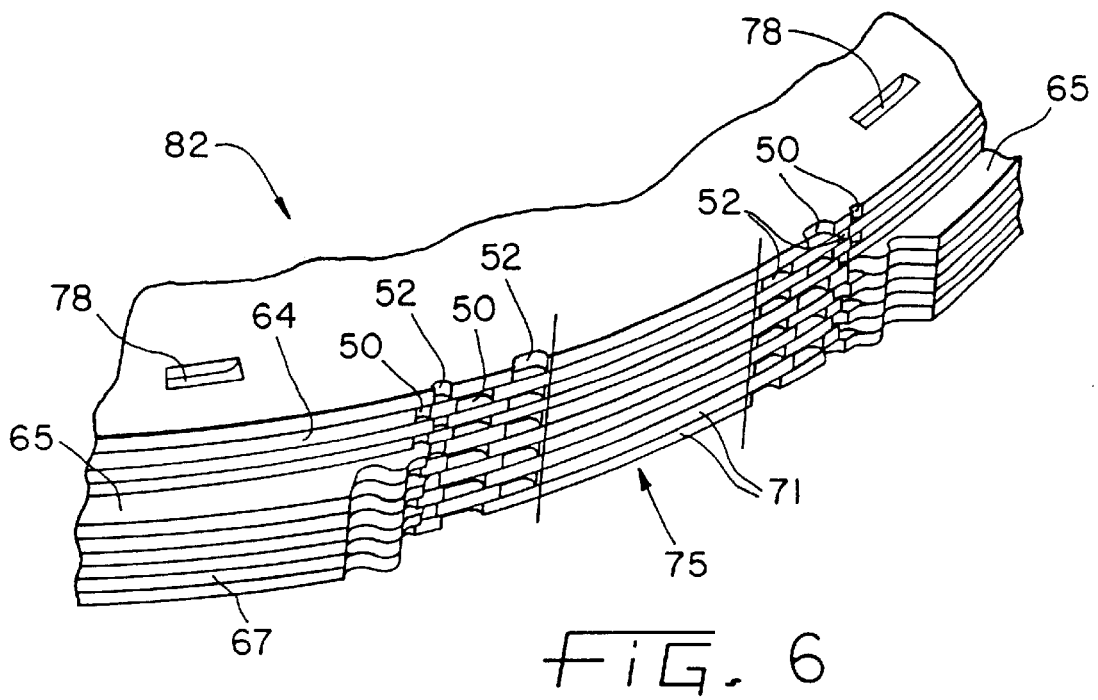
FIG. 6 is a partial perspective view of the stator core of FIG. 5.
Figure 7:
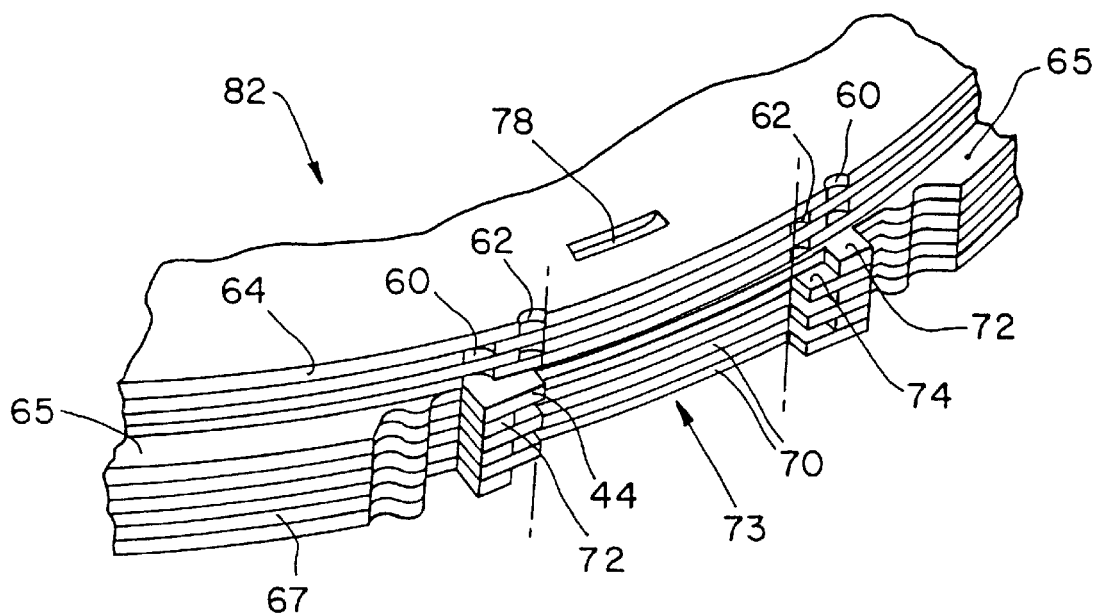
FIG. 7 is another partial perspective view of the stator core of FIG. 5.

A second strip layout showing a stamping progression in accordance with the present invention is shown in FIG. 4. The laminations produced by the strip layout of FIG. 4 are used to produce a stator core having projecting flanges on only some of the laminations within each stator core as shown in FIGS. 5–7. Prior to reaching Station A, pilot pin holes 46, stator bore hole 48, first ribbed slot 50 and second ribbed slot 52 are punched during the production of a rotor lamination which is removed from the strip stock 54 prior to Station A.

At Station A, two common choke surfaces comprising a circular portion with a minor diameter 63 are defined by stamping edge slots 56. Edge slots 56 are not perfectly symmetrical about centerline 61 but are slightly offset and extend further to the left as seen in FIG. 4.

Station B is a selectively actuated, or cammed, station at which a minor circular perimeter 64 having a minor outer diameter 63 is defined by triangular punches 58 for certain laminations. Just inside the edges of the common choke surfaces 70 defined at Station A, first and second rounded corners 60 and 62 project inwardly on the punches and thereby cut the common choke surfaces 70 at a roughly 90° angle and avoid the difficulties which can arise when attempting to feather a cut into a preexisting edge.

First and second ribbed slots 50 and 52 also have similar rounded corners to allow for a cleaner cut. Second ribbed slot 52 is closer to centerline 51 than first ribbed slot 50; and rounded corners 62 are closer to centerline 61 than rounded corners 60 as further explained herein below.

Station C is idle and the minor circular perimeter 64 is shown in dashed outline. The material outside the minor perimeter 64 would not be present for those laminations which were stamped by the selectively actuated die at Station B.

The winding slots 66 are stamped at Station D for all of the laminas. At Station E the major outside perimeter 67, having a major diameter 69, is punched by means of two punches 68 which form an hourglass shape. Station E does not have to be selectively actuated and removes no material for those laminations which have already had a minor perimeter defined at Station B. The hourglass shaped punches 68 do not intersect common choke surface 70 on the edge of each lamination but instead leave short and long locator ribs 72 and 74, respectively.

Figure 8:
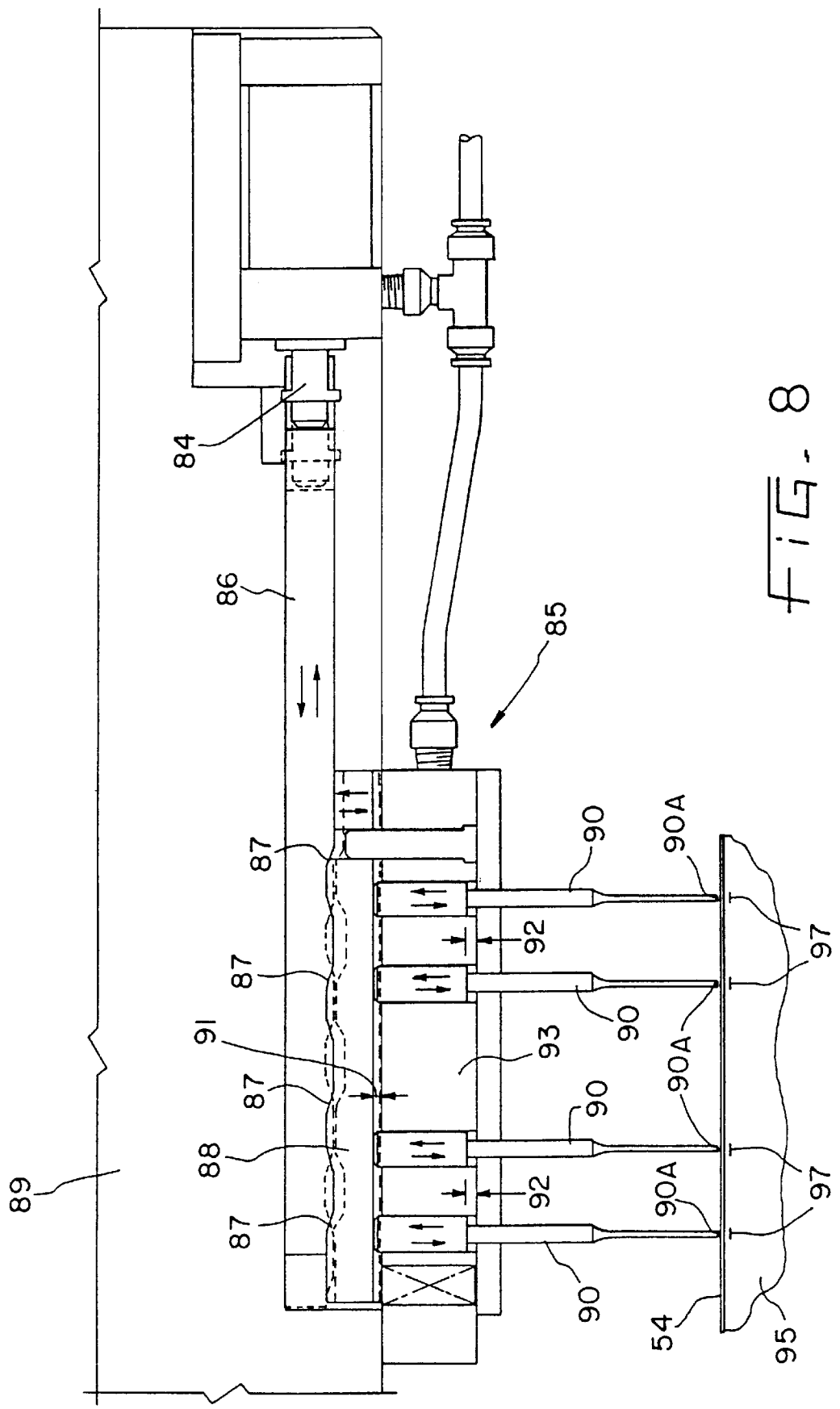
FIG. 8 is an elevational view of the camming arrangement of a selectively actuated die for manufacturing laminas with a plurality of outer perimeter configurations.

Station F is selectively actuated and punches a tab receiving slot 76 in those laminations which will form the bottom lamination of each lamination stack 82. A partial cross-sectional view of Station F is shown in FIG. 8 and illustrates the operation of a selectively actuated punch 85. Piston 84 is used to control the position of first camming bar 86 which reciprocates in the horizontal direction to thereby move camming bar 88 in a vertical direction due to the interaction of camming surfaces 87. When camming bars 86 and 88 are in the positions shown in solid lines, die punches 90 are positioned as shown in FIG. 8. When in this position, die punches 90 do not remove material from the strip stock. Die punches 90 are allowed to reciprocate vertically with respect to punch block 93 as well as move vertically as a unit with upper die assembly 89.

When piston 84 moves first camming bar 86 into the position shown in dotted outline in FIG. 8, the second camming bar 88 is moved into the position shown by the dotted outline in FIG. 8 due to the interaction of camming surfaces 87. In this actuated position the second camming bar 88 is moved downward a short vertical distance 91 and thereby forces punches 90 to reciprocate downward distance 92 with respect to punch block 93 and into an actuated position. The upper die assembly 89 is shown in its lowermost position with respect to die bed 95 in FIG. 8. As seen in FIG. 8, punch tips 90A do not punch strip stock 54 during operation of the die when the punches 90 are not in an actuated position. When actuated, punch tips 90A reach a lowermost position at lines 97 within a cooperating aperture (not shown) in the die bed 95 when the upper die assembly 89 is moved downward as a unit. Thus, the punches 90 create tab receiving slots 76 in the strip stock 54 during operation of the die with the punches actuated but do not create tab receiving slots 76 during operation of the die when the punches are not actuated. Other cammed or selectively actuated stations operate in a similar manner. A center interlock may be alternatively used such as described in U.S. patent application Ser. No. 07/966,876 filed Oct. 26, 1992, assigned to the assignee of the present invention, the disclosure of which is expressly incorporated herein by reference.

At Station G, shown in FIG. 4, interlock tabs 78 are punched. Station H is idle, and at Station I the laminations are punched into rotatable choke barrel 94 (not shown in FIG. 4). A small carrier strip 80 is cut from one end of the lamination defining a common choke surface 71 (shown in FIG. 6) and, on the opposing side of the lamination, another common choke surface 71 is defined along dashed line 81 where the lamination is cut from the strip stock. The carrier strip 80 interconnects the laminas allows the laminas to be transported as a strip between stations before they are blanked into the choke barrel. Other well known means may also be used; such as pushback designs, which are generally impractical for stator cores because of the increased strip width which is required; and semi-scrapless designs, in which only a single cut, severing the lamina from the strip stock, is made at the last station.

Figure 9:
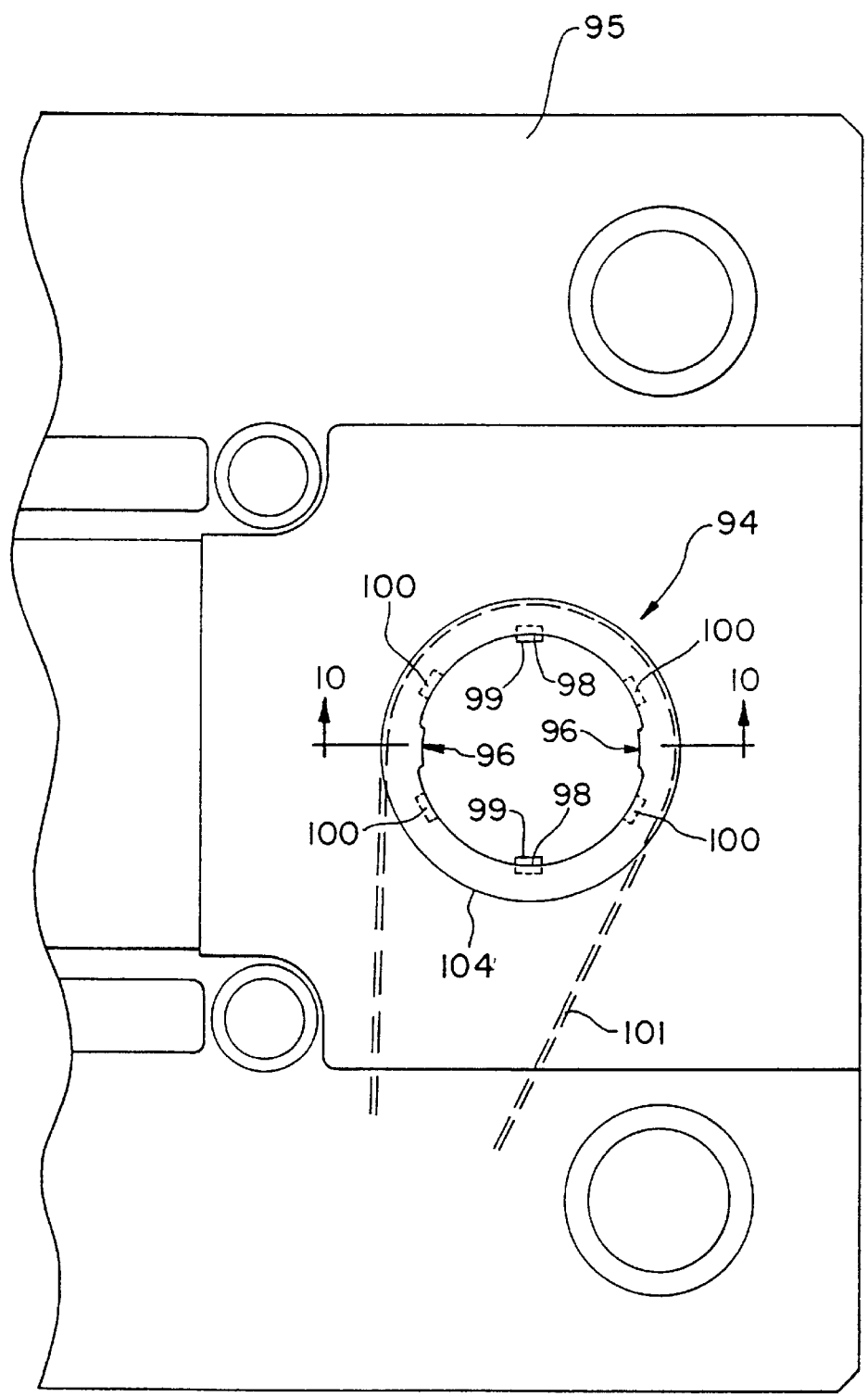
FIG. 9 is a partial plan view of a die with a rotatable choke barrel having an alignment surface.
Figure 10:
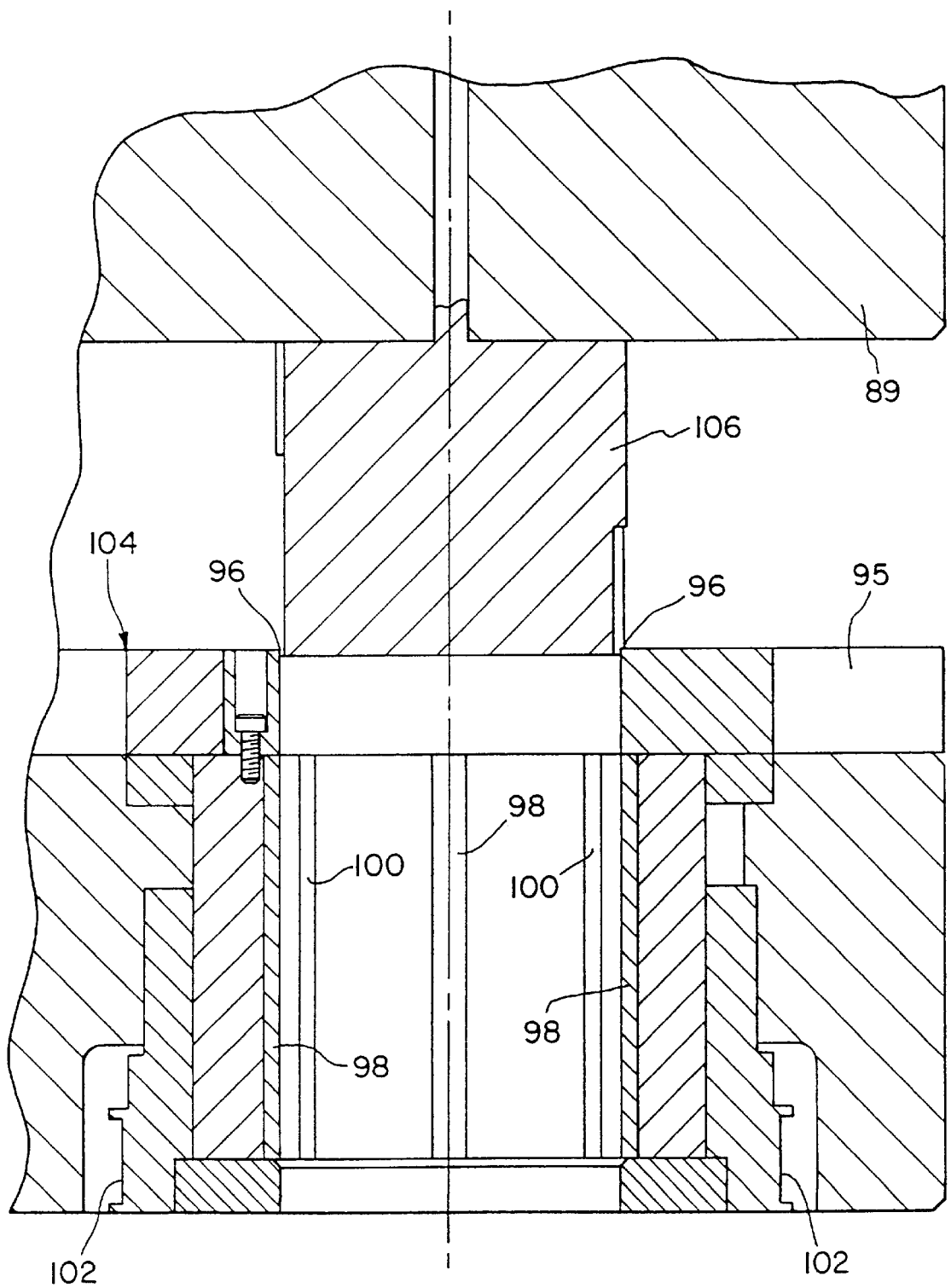
FIG. 10 is a cross-sectional view taken along line 10—10 of FIG. 9.

Rotatable choke barrel 94 is shown in FIGS. 9 and 10. Common choke surfaces 71, shown in FIG. 6, are defined by cutting edges 96. Carbide inserts 98 having aligning surfaces which engage common choke surfaces 70 of each of the laminations project into the interior of the choke barrel 94. Similar carbide inserts are located below cutting edges 96 and engage common choke surfaces 71 of each of the laminations. Carbide inserts 100 engage the outer perimeter surface of only those laminations having a major outside diameter.

A servo drive system, mechanical indexer or other means rotates the choke barrel 94 by means of a belt 101. The belt, not shown in FIG. 10, is located in recess 102. The rotating choke barrel 94 engages the die bed 95 at surface 104. Punch 106, shown in FIG. 10, presses the individual laminations into interlocked engagement with the laminations which are already within the choke barrel for those laminations which have interlock tabs. The rotation of choke rings is known in the art, as shown for example, by U.S. Pat. No. 5,377,115 assigned to the assignee of the present invention, the disclosure of which is expressly incorporated herein by reference.

The choke barrel 94 is rotated between each operation of the die assembly, for example, by 180° for producing lamination stack 82. Accurate rotation of the laminas is important to maintain vertical registry of the winding slots 66. The rotation serves several purposes, first it corrects for thickness inconsistencies in the strip stock. Second, it prevents ribbed slots 50 and 52 and indentations 60 and 62 from being aligned. The non-aligned slots and indentations are shown in FIGS. 6 and 7. This allows a cup-shaped endshield to be force-fit over the end laminas having a minor outside perimeter 64 and to abut the shoulder 65 formed by the laminas having a major outside perimeter 67. The endshield thereby hermetically seals the interior of the stator core. The hermetic seal would not be possible if the laminas were not rotated to prevent alignment of the ribbed slots 50 and 52 and rounded corners 60 and 62 on the laminas having a minor outside perimeter 64. Providing a hermetically sealed endshield allows a motor which incorporates stator core 82 to be safely used in environments where flammable vapors are present. Although, the disclosed embodiment rotates each lamina 180° with respect to the previous lamina, other angles and counts (or frequencies) of autorotation may also be used.

The individual common choke surfaces 70 and 71 disposed on the outer perimeter of each lamination form choke surfaces 73 and 75, respectively, which extend continuously in an axial direction of the stack across a portion of the outer perimeter of each of the laminas which comprise the stator stack 82 as illustrated in FIGS. 6 and 7. Common choke surfaces 70 and 71 are pressed into engaging contact with aligning surfaces 99 of carbide inserts 98 when the laminas are blanked into the rotatable choke barrel 94.

Figure 11:
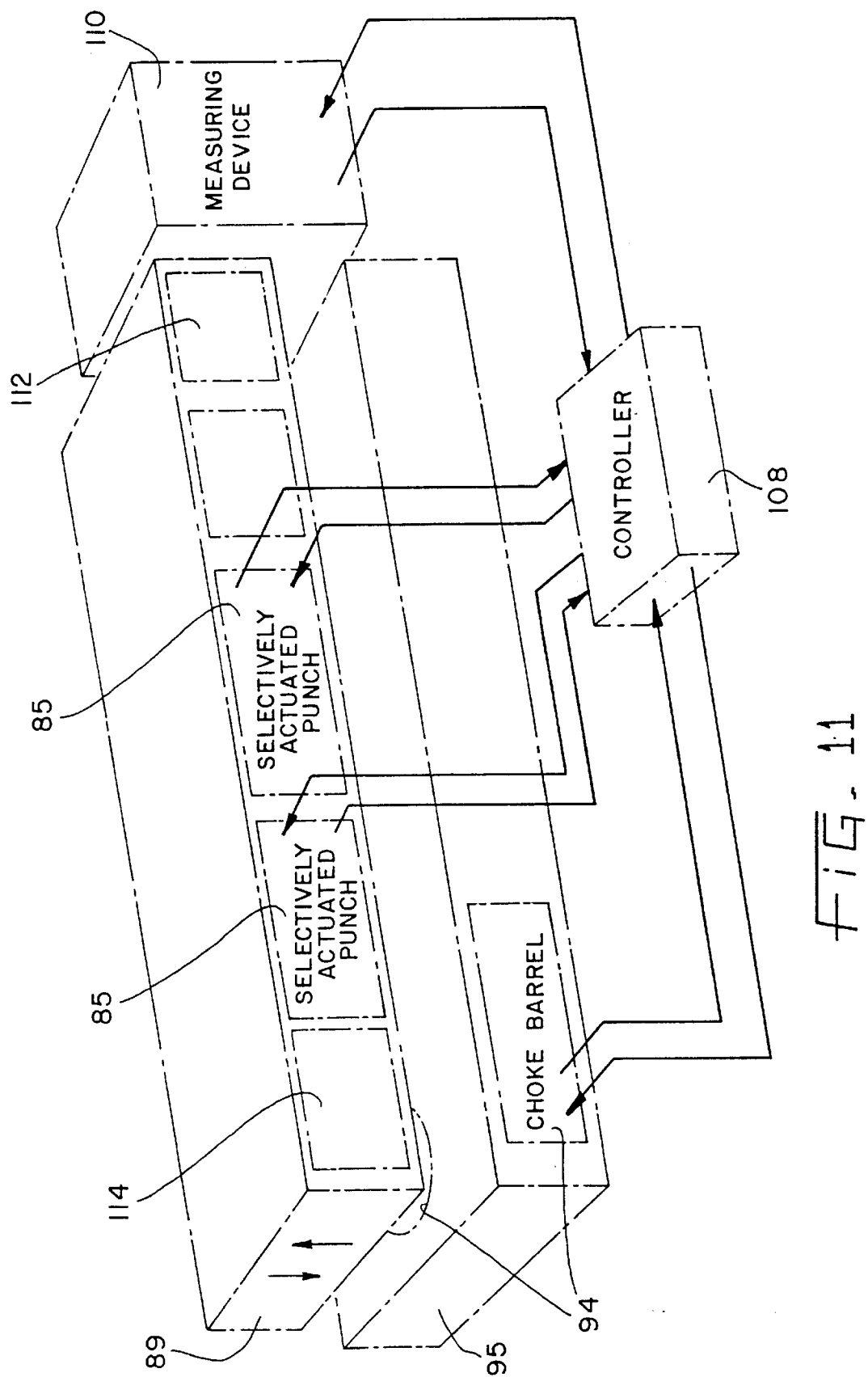
FIG. 11 is a schematic illustration of the interconnections between a die controller, a measuring device, and a die with a rotatable choke barrel.

FIG. 11 provides a schematic illustration of the die assemblies used to manufacture lamina stacks 42 and 82. In FIG. 11, the initial station 112 corresponds to Stations 1 and A for the embodiments described above while the final or blanking station 114 corresponds to Stations 7 and I. FIG. 11 also includes schematic representations of selectively actuated punch stations 85 which correspond to Stations 2 and 5, and B and F, discussed above, FIG. 11 does not, however, include representations of each of the remaining stations. Choke barrel 94 can be either stationary or rotatable and does not require a communications link with controller 108 in all embodiments of the invention.

A controller 108 is used to control the selectively actuated punches 85 and may be used to control the autorotation of the choke barrel 94. The choke barrel 94 may also be stationary or employ a mechanical indexer, in which case the controller 108 would not need to be linked with choke barrel 94. The controller can be programmed to produce laminas in the alignment necessary to produce the desired stator cores. It is also possible, but not required, to employ a measuring device 110, shown schematically in FIG. 11, to determine the thickness of the sheet stock at one or more points along its width. The measured thickness values would be transmitted to the controller 108. The controller 108 would then be used to calculate the number of laminations which are required to achieve the desired height of the lamination stack, preferably by calculating the number of laminations required for each stack segment having a particular outside perimeter configuration.

Instead of measuring the strip stock at two different locations along its width and using a measured strip stock thickness inconsistency to calculate the amount of rotation required, the irregularities present in the strip stock can be evenly distributed about the lamina stack axis by rotating all of the laminas a predetermined amount without explicitly calculating the thickness inconsistency.

Autorotation of laminas to correct for thickness variations is known in the art and one such method is disclosed in U.S. Pat. No. 5,359,763 assigned to the assignee of the present invention, the disclosure of which is expressly incorporated herein by reference. Control of the stack height can also involve the use of a coreweighing system as disclosed in U.S. Pat. No. 5,365,021 assigned to the assignee of the present invention, the disclosure of which is expressly incorporated herein by reference.

Figure 12:
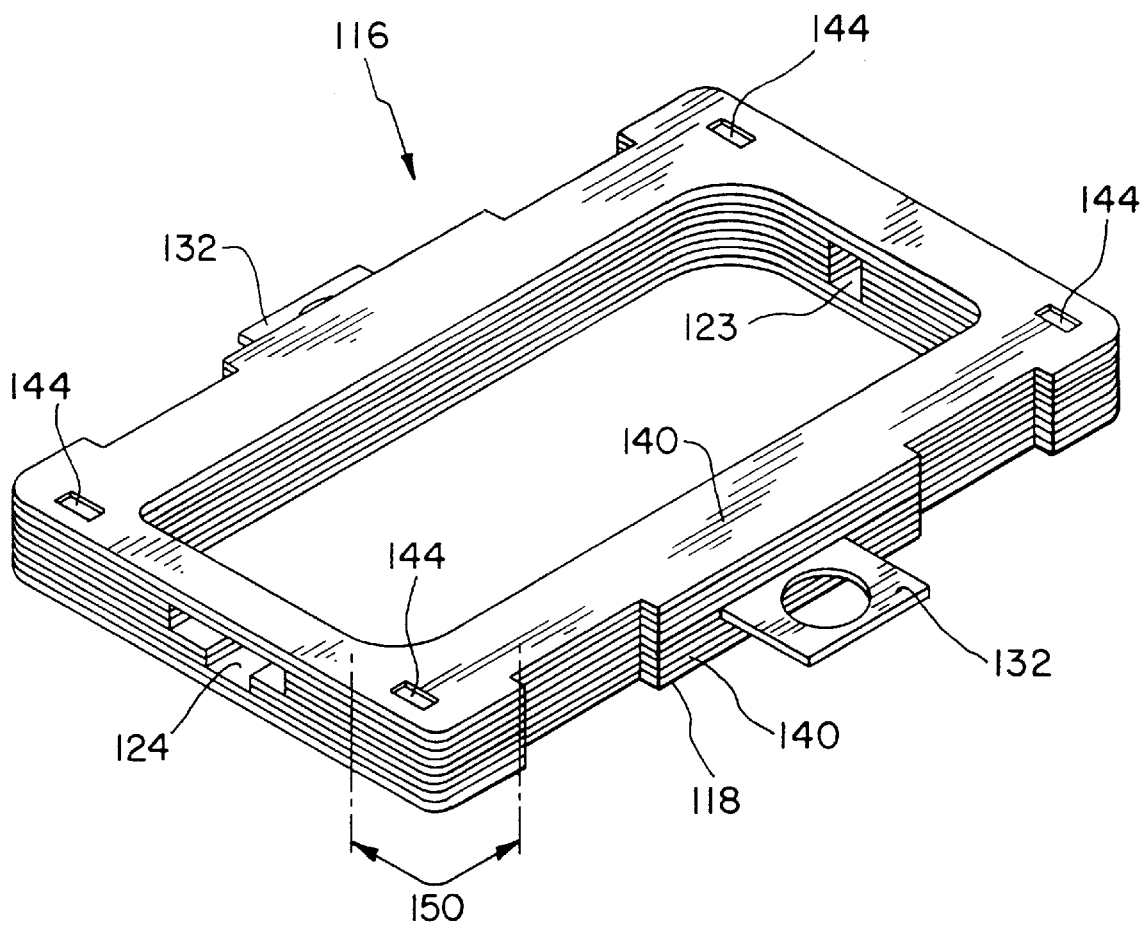
FIG. 12 is perspective view of a lamina stack which includes lamination layers comprised of a plurality of discrete segments.
Figure 13A:
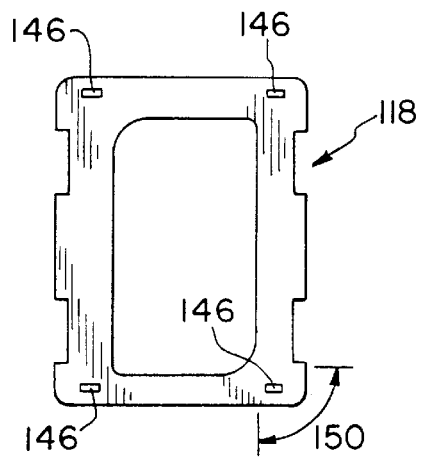
FIG. 13A is a plan view of a lamina forming a portion of the lamina stack of FIG. 12.
Figure 13B:
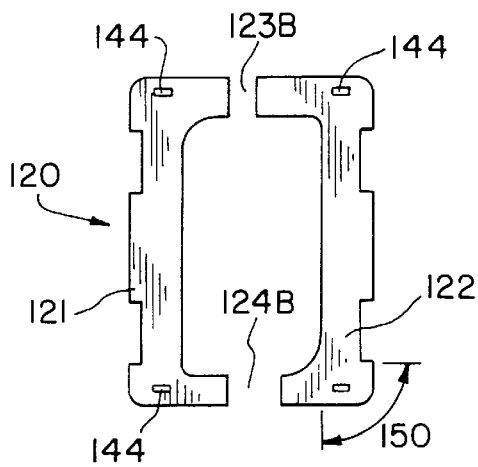
FIG. 13B is a plan view of a lamina forming a portion of the lamina stack of FIG. 12 and which is comprised of a plurality of discrete lamina segments.
Figure 13C:
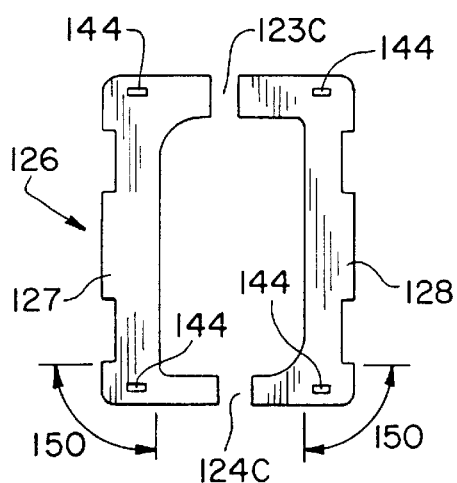
FIG. 13C is a plan view of a lamina forming a portion of the lamina stack of FIG. 12 and which is comprised of a plurality of discrete lamina segments.
Figure 13D:
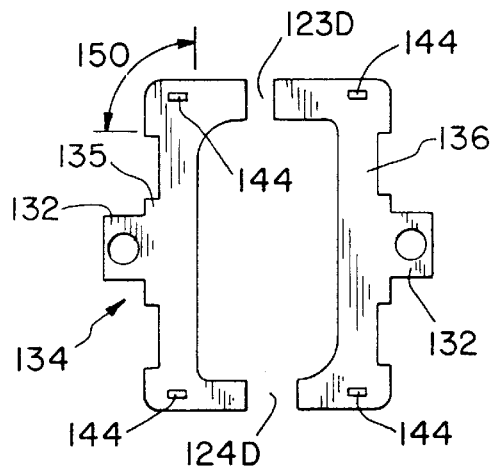
FIG. 13D is a plan view of a lamina forming a portion of the lamina stack of FIG. 12 and which is comprised of a plurality of discrete lamina segments.
Figure 13E:
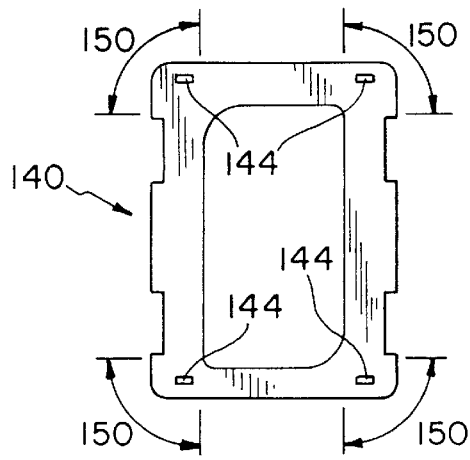
FIG. 13E is a plan view of a lamina forming a portion of the lamina stack of FIG. 12.

In accordance with another embodiment of the present invention, FIG. 12 illustrates a lamina stack 116 having laminas with a plurality of outer perimeter configurations and which includes several laminas or lamination layers which are comprised of a plurality of discrete lamina segments. The individual lamina layers which are used to form lamination stack 116 are illustrated in FIGS. 13A–13E. Lamina 118 is shown in FIG. 13A and has a continuous and unbroken outer perimeter. Lamina 118 has its interlock tabs 144 completely removed thereby leaving only interlock slots 146 and forming a bottom lamination 118 of stack 116 which will not interlock with a lamina stack positioned immediately below bottom lamina 118 in choke barrel 148. Lamina 120, shown in FIG. 13B, is comprised of discrete lamina segments 121 and 122, and has an outer perimeter configuration defines openings 123B and 124B. Lamina 126, shown in FIG. 13C, is comprised of discrete lamina segments 127 and 128, and has an outer perimeter which defines openings 123C and 124C. Lamina 134, shown in FIG. 13D, is comprised of discrete lamina components 135 and 136, and has an outer perimeter configuration which defines openings 123D and 124D. Lamina 134 also includes projecting flanges 132. Lamina 140 is shown in FIG. 13E and has interlock tabs 144 but is otherwise similar to lamina 118. The "recipe" for lamina stack 116 from bottom lamination through final lamination is lamina 118, lamina 140, lamina 126, lamina 126, lamina 134, lamina 120, lamina 120, lamina 140, and lamina 140.

The various features, including interlock tabs, of laminas 118, 120, 126, 134, 140 are formed by progressively stamping a length of strip stock material by actuating punches in a controlled sequence in a manner similar to that described above for forming the laminas of stacks 42 and 82. After laminas 118, 120, 126, 134 and 140 have been stacked to form lamina stack 116, individual lamina openings 123B, 123C and 123D are aligned and form opening 123. Likewise, individual lamina openings 124B, 124C and 124D form opening 124 in the opposite side of lamina stack 116.

The bottom lamina 118 is followed by a lamina 140 which has interlock tabs 144 formed therein which engage bottom lamina 118 and leave corresponding interlock slots 146 for engagement by the interlock tabs of the upper adjacent lamina. The remaining discrete lamina components 121, 122, 127, 128, 135 and 136 each have interlock tabs 144 and slots 146 formed therein.

Lamina stack 116 includes laminas which define a plurality of outer perimeter configurations and which utilize common choke surfaces 150. Common choke surfaces 150 are located on the corners of each of the laminas and lamina segments. The locations of common choke surfaces 150 are shown in FIG. 13E. Common choke surfaces 150 are also shown in the perspective view of FIG. 12. The interior of choke barrel 148 includes alignment surfaces which engage the common choke surfaces 150 of each of the laminas and lamina segments which comprise lamina stack 116 to maintain the laminas in an aligned position and resist the downward movement of the lamina stack through the choke barrel. Resistance to downward movement in the choke barrel provides the back pressure necessary to engage the interlock tabs of the laminas when a lamina is pressed into engagement with a partially formed stack in choke barrel 148.

Choke barrel 148 is a steel choke barrel with the alignment surfaces formed integrally with the remaining interior surface of choke barrel 148. Alternatively, carbide inserts could be used to form the alignment surfaces. The remaining interior surface of choke barrel 148 is configured to allow all of the lamina configurations used to form stack 116 to enter choke barrel 148. The remaining portion of the choke barrel interior surface is configured so that the only engagement of the choke barrel 148 with the individual lamina layers occurs at the alignment surfaces, in other words, the interior of the choke barrel, except for at the alignment surfaces, does not conform to the outer perimeter of any of the laminas. Alternatively, the remaining portion of the choke barrel interior surface could engage portions of the laminas along portions of the "larger" outer perimeters at locations other than the alignment surfaces.

The alignment surfaces of choke barrel 148 provide an interference fit with the laminas used to form stack 116. Excessively tight interference fits are undesirable because they can lead to a bowing of the individual laminas which are pressed into the choke barrel. The use of discrete lamina segments to form an individual lamina layer, such as laminas 120, 126 and 134 in stack 116, may increase the susceptibility of a lamina layer to undesirable bowing and distortion. The geometric configuration of the individual laminas and lamina segments and the physical properties of strip stock material 154 are both factors in determining the susceptibility of a lamina layer to undesirable bowing or distortion.

To minimize the risk of undesirable bowing, the alignment surfaces of choke barrel 148 utilize a relatively light interference fit which exerts a reduced pressure on each individual lamina but which develops that pressure over a relatively greater vertical depth 152 to thereby provide an adequate total back pressure for engagement of interlock tabs 144. For example, in an application wherein a conventional interference fit might involve a 0.001 inch interference fit and a choke depth of 1.25 inches, the present application might utilize a 0.0002 to 0.0005 inch interference fit and a choke depth of 3 inches. Resistance to downward movement within the choke barrel is needed to facilitate the engagement of interlock tabs 144 of the lamina being blanked with the interlock slots 146 of the uppermost lamina in the choke barrel. The pressure exerted on the individual laminas not only provides resistance to downward motion through the choke barrel but also helps maintain the laminas in proper alignment Due to the relatively short height of lamina stack 116, i.e., nine laminations, the compounding of the thickness inconsistencies of the individual laminas is not likely to create significant variances in the final dimensions of lamina stack 116. Thus, illustrated choke barrel 148 is non-rotatable. However, alternative embodiments could utilize a rotatable choke barrel.

The stacking of a plurality discrete lamina segments to form a single lamina layer is schematically illustrated in FIGS. 14–17. FIGS. 14–17 sequentially illustrate the blanking station, at which discrete lamina segments 127, 128 are automatically stacked within choke barrel 148, during a single die stroke.

The laminas and lamina segments which comprise lamina stack 116 are formed by stamping various features in strip stock material 154 as it progresses through the die assembly prior to reaching the blanking station illustrated in FIGS. 14–17. The laminas and lamina segments are attached to the strip stock material through strip stock material bridges which are severed by blanking punch 156. Strip stock material includes pilot pin holes 158 which form apertures in the carrier portion of the strip stock material, i.e., that portion of strip stock material which is not used to form laminas. Pilot pin holes 158 are used to maintain the strip stock material in a desired position relative to the die stations as it is stamped during its advancement through the die assembly. As can be seen in FIGS. 14–17, pilot pin 160 passes through pilot pin hole 158 and enters guide bore 162 to properly locate strip stock material 154 and the laminas and lamina segments which are attached thereto by the sheet stock material bridges relative to the blanking station prior to stamping the strip stock material 154. Although only one pilot pin 160 is illustrated, pilot pins are located adjacent each punching station of the die assembly to maintain strip stock material 154 in proper alignment during stamping operations.

Figure 14:
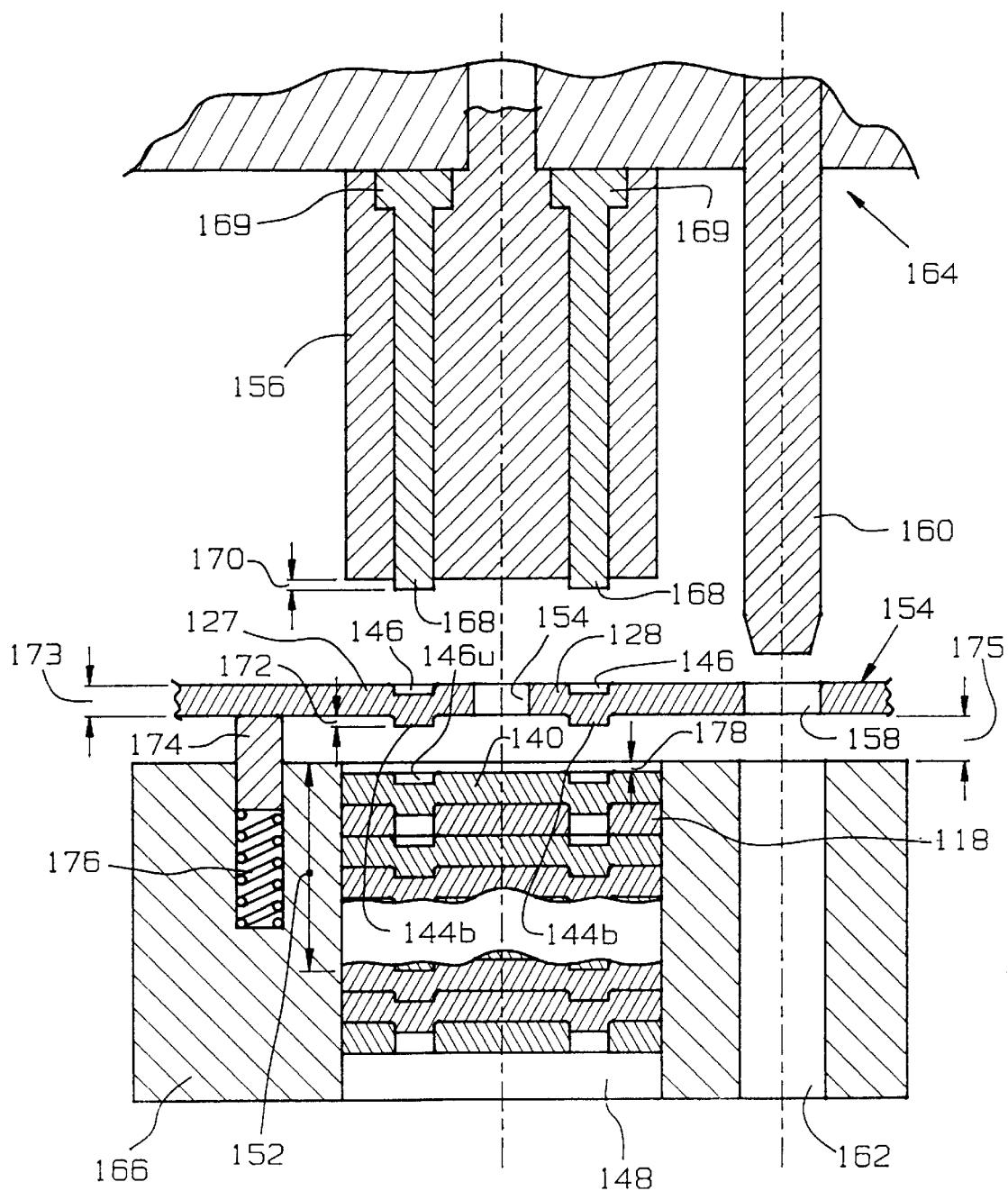
FIG. 14 is a schematic cross sectional view of a die assembly at a blanking station at the beginning of a stamping stroke.

FIG. 14 schematically illustrates a portion of upper die assembly 164 and lower die bed 166. Upper die assembly 164 reciprocates vertically, together with pilot pin 160 and blanking punch 156, to stamp the laminas. Blanking punch 156 severs the material bridges connecting the laminas to the remainder of strip stock material 154. Blanking punch 156 also pushes the laminas into engagement with the uppermost lamina layer disposed in choke barrel 148.

Blanking punch 156 includes staking punch inserts 168 which extend below the bottom surface of the blanking punch by a distance designated 170 in FIG. 14. Staking punches 168 correspond to the location of interlock tabs 144 and enter the lamina slot 146 of the lamina or lamina segments being blanked from strip stock 154 and positively engage the respective lamina tabs 144b of the lamina being blanked with the respective interlock slots 146u of the uppermost lamina layer disposed in choke barrel 148.

Staking punches 168 are held in a fixed position relative to blanking punch 156 and includes a head 169 which is seated in a counterbore in blanking punch 156. A grind collar (not shown) may be located below head 169 to permit the lowering of staking punch 168 relative to blanking punch 156. Lowering of the staking punch might be necessary due to chipping or wear of staking punch 168 or to accommodate different interlock tab depths.

A number of different interlock tab designs are known in the art and the tab design will influence the selection of the appropriate tab depth. In one design, three of four sides of a tab are severed from the remainder of the lamina and the tab may be distended below the bottom surface of the lamina by a relatively large distance. In the illustrated embodiment, lamina stack 116 utilizes an alternative design in which no portion of interlock tab 144 is completely severed from the surrounding lamina material. Instead, interlock tab 144 is partially blanked from the surrounding material, deforming, but not severing, the material at the edges of interlock tab 144. Tabs 144 extend below the bottom of the remainder of the lamina by approximately ½ to ⅓ the thickness of the lamina layer. Alternative embodiments of the present invention may employ alternative interlock styles or have the interlock tabs extend a greater or less distance below the remainder of the lamina.

The thickness of the lamina is designated 173 in FIG. 14. The distance by which tab 144 extends below the lower lamina surface is designated 172 in FIG. 14 and is equivalent to the distance 170 staking punch 168 extends below blanking punch 156 and is approximately one half of thickness 173. The length designations shown in FIG. 14 are included merely to provide a convenient mechanism for graphically identifying the lengths and spatial relationships discussed herein and are not necessarily to scale.

As discussed above, staking punches 168 are used to ensure engagement of interlock tabs 144 into interlock slots 146 and to prevent interlock tabs 144 from being forced upwardly into the horizontal plane of the remainder of the lamina when tab 144 engages the uppermost lamina in choke barrel 148. Staking punches 168 extend a distance 170 below the blanking punch 156. Distance 170 is equivalent to the depth it is desired to have the interlock tab 144 enter the interlock slot 146 of the lower adjacent lamina layer. Generally, this distance 170 will be equivalent to the distance 172 which the interlock tab 144 extends below the lower surface of the strip stock material 154 when tab 144 is formed.

Each of the laminas and lamina segments of stack 116 has at least one interlock feature formed therein. The bottom lamination of each stack, however, has its interlock tabs completely blanked, i.e., removed, to prevent the bottom lamina 118 from being engaged with the uppermost lamina of the previously formed stack when the bottom lamina 118 is separated from the strip stock material and pushed into the choke barrel. Interlocking the tabs 144 and slots 146 of adjacent lamina layers maintains the lamina layers in proper relative alignment both when the stack is within choke barrel 148 and after the stack has been removed from choke barrel 148.

Stock lifters 174 are used to prevent interlock tabs 144 from being biased upwardly into the horizontal plane of the strip stock material 154 or from being snagged on lower die bed 166 during the progressive movement of strip stock material 154. Stock lifters 174 are biased upwards by springs 176 and lift strip stock material 154 above the upper surface of the lower die bed 166 when strip stock material 154 is being advanced between die stamping strokes. The strip stock material 154 is lifted by the stock lifters 174 a distance designated 175 in FIG. 14. Lifter distance 175 is often times equivalent to approximately 1.5 times the thickness 173 of the strip stock material 154 to provide an ample clearance. The illustrated stock lifters 174 are cylindrical. However, other types of stock lifters, such as bar type lifters, are known in the art and can also be used with the present invention.

Figure 15:
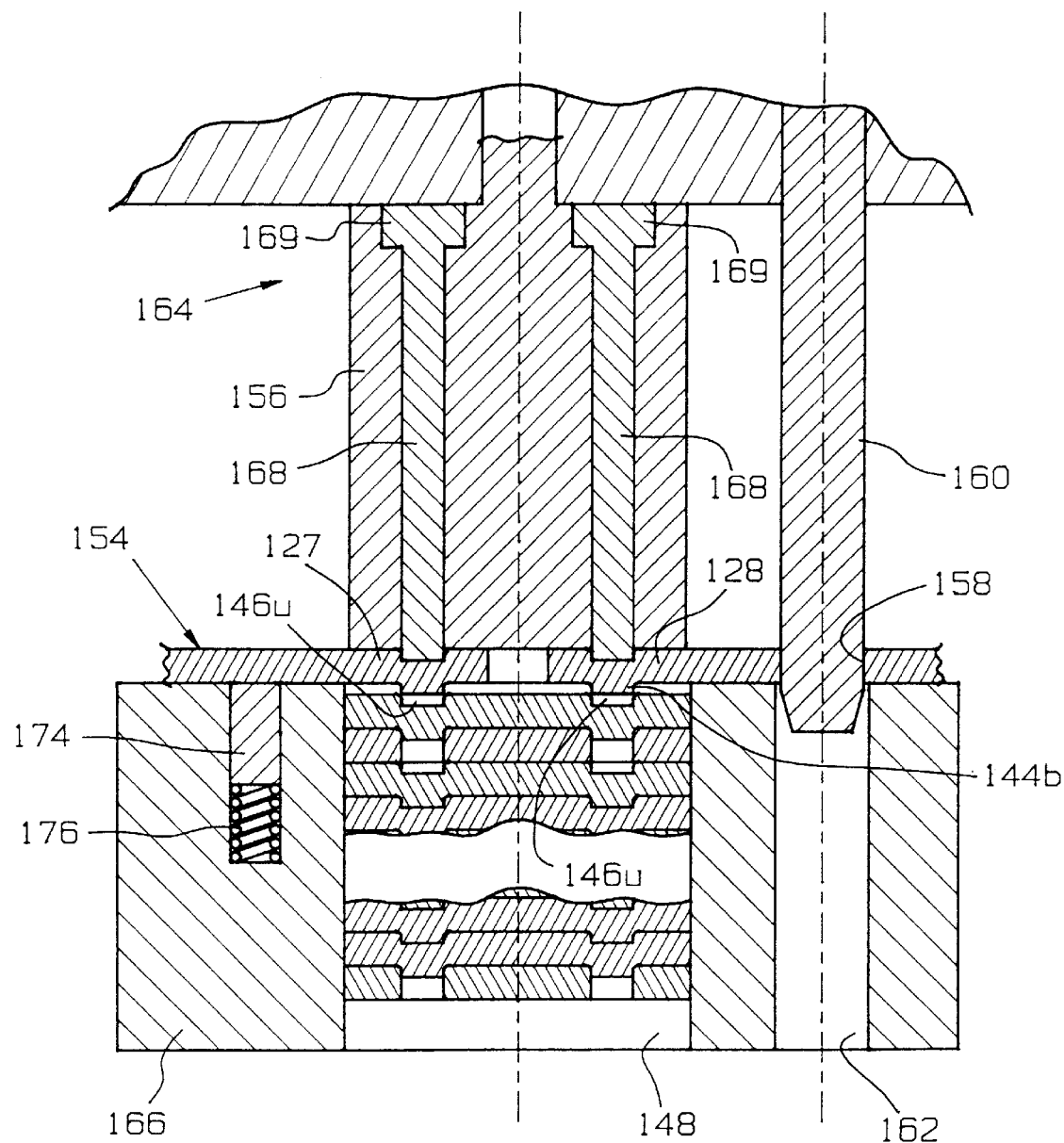
FIG. 15 is a schematic cross sectional view of the die assembly of FIG. 14 after the guide pin has entered the guide bore.

FIG. 14 illustrates the relative positions of upper die assembly 164, punches 156, 168, lower die bed 166 and strip stock material 154 at the initiation of a stamping stroke at the blanking station of the die assembly. FIG. 15 illustrates the die assembly during the downstroke after pilot pin 160 has extended through pilot pin hole 158 and has entered guide bore 162 to thereby properly locate strip stock material 154 and lamina segments 122, 124 which are attached thereto. Shortly after pilot pin 160 has properly aligned strip stock material 154, and the laminas and lamina segments attached thereto by material bridges, staking punches 168 enter the interlock slots 146 of the lamina layer which is about to be blanked. Shortly after the staking punches 168 enter interlock slots 146, blanking punch 156 engages the upper surface of the lamina layer.

Stock lifter spring 176 has been compressed and strip stock material 154 is pressed against the upper surface of lower die bed 166 in FIG. 15. The strip stock material 154 may be pressed against the lower die bed 166 by engagement with the downwardly moving punches or by another suitable mechanism, such as a spring stripper, attached to the upper die assembly 164 which presses the strip stock material against lower die bed 166 prior to the engagement of the punches and strip stock material 154.

Figure 16:
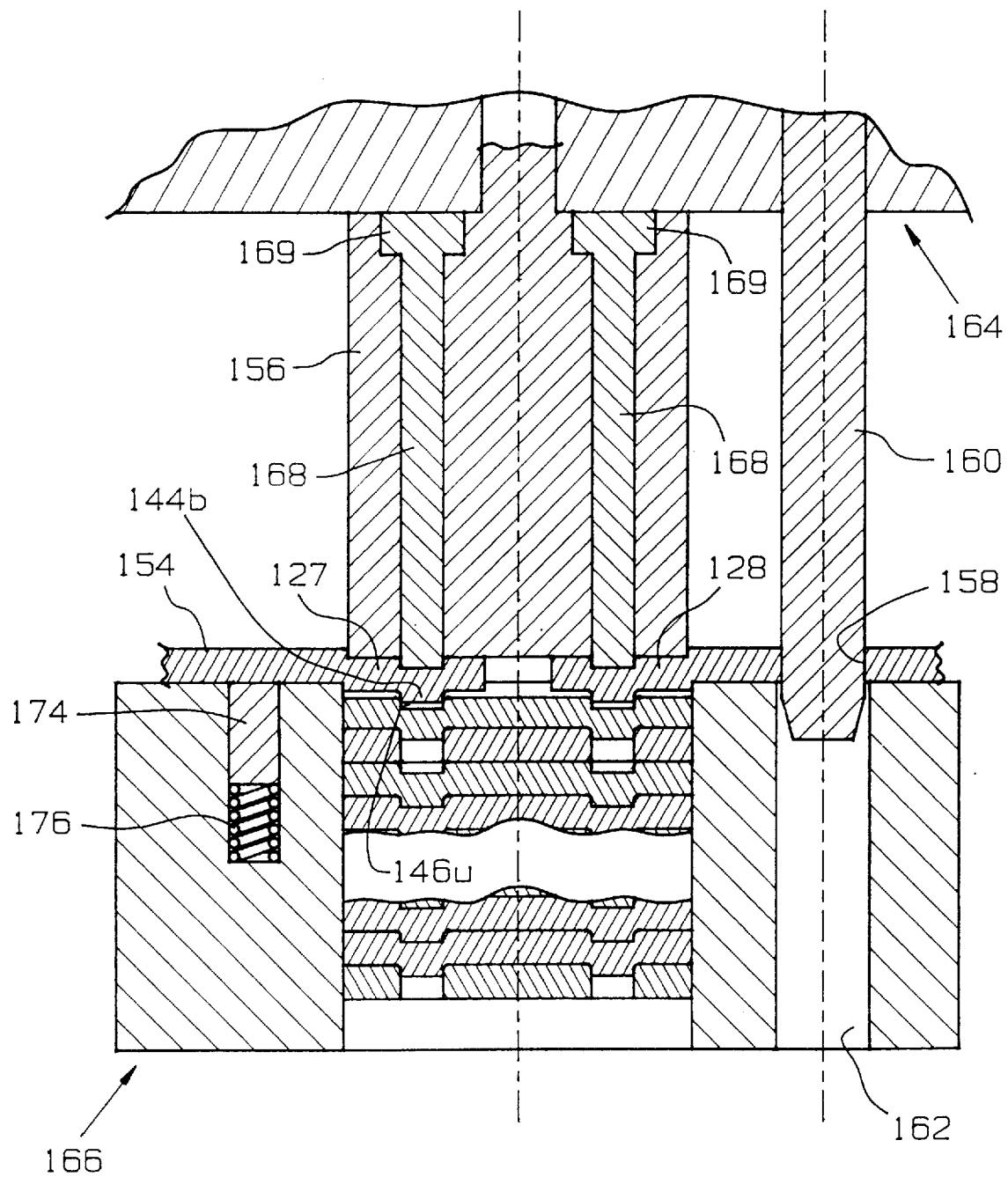
FIG. 16 is a schematic cross sectional view of the die assembly of FIG. 14 wherein the interlock tabs of the discrete lamina segments are being engaged with the uppermost lamina disposed in the choke barrel.

FIG. 16 illustrates the blanking station after the blanking punch has begun to sever lamina segments 122 and 124 from the remainder of strip stock material 154. As shown schematically in FIG. 16, interlock tabs 144b of lamina segments 122, 124 are already partially engaged with interlock slots 146u of the uppermost lamina layer in choke barrel 148. The partial engagement of interlock tabs 144b and interlock slots 146u occurs prior to the complete separation of lamina segments 122, 124 from the remainder of the strip stock material.

Engaging interlock tabs 144b of the discrete lamina segments 122, 124 prior to completely severing lamina segments 122, 124 from the remainder of the strip stock material 154 permits the aligned stacking of lamina 120 even though the segments, once blanked, become separated from each other. The proper and positive alignment of discrete lamina segments 122, 124 is continuously maintained during the stamping process. Initially, guide pin 160 maintains the proper alignment of lamina segments 122, 124 by aligning strip stock material 154. Prior to completely severing lamina segments 122, 124 from strip stock material 154, interlock tabs 144b of the discrete lamina segments being blanked are engaged with interlock slots 146u of the uppermost lamina layer in choke barrel 148 to maintain the alignment of the discrete lamina segments.

To accomplish the engagement of interlock tabs 144b and interlock slots 146u of adjacent laminas prior to the complete severing of the blanked lamina layer from the strip stock material 154 the uppermost lamina must be positioned in choke barrel 148 near the upper surface of lower die bed 166. The uppermost lamina is positioned a distance 178 below the entrance of the choke barrel located in the upper surface of the lower die bed.

Figure 17:
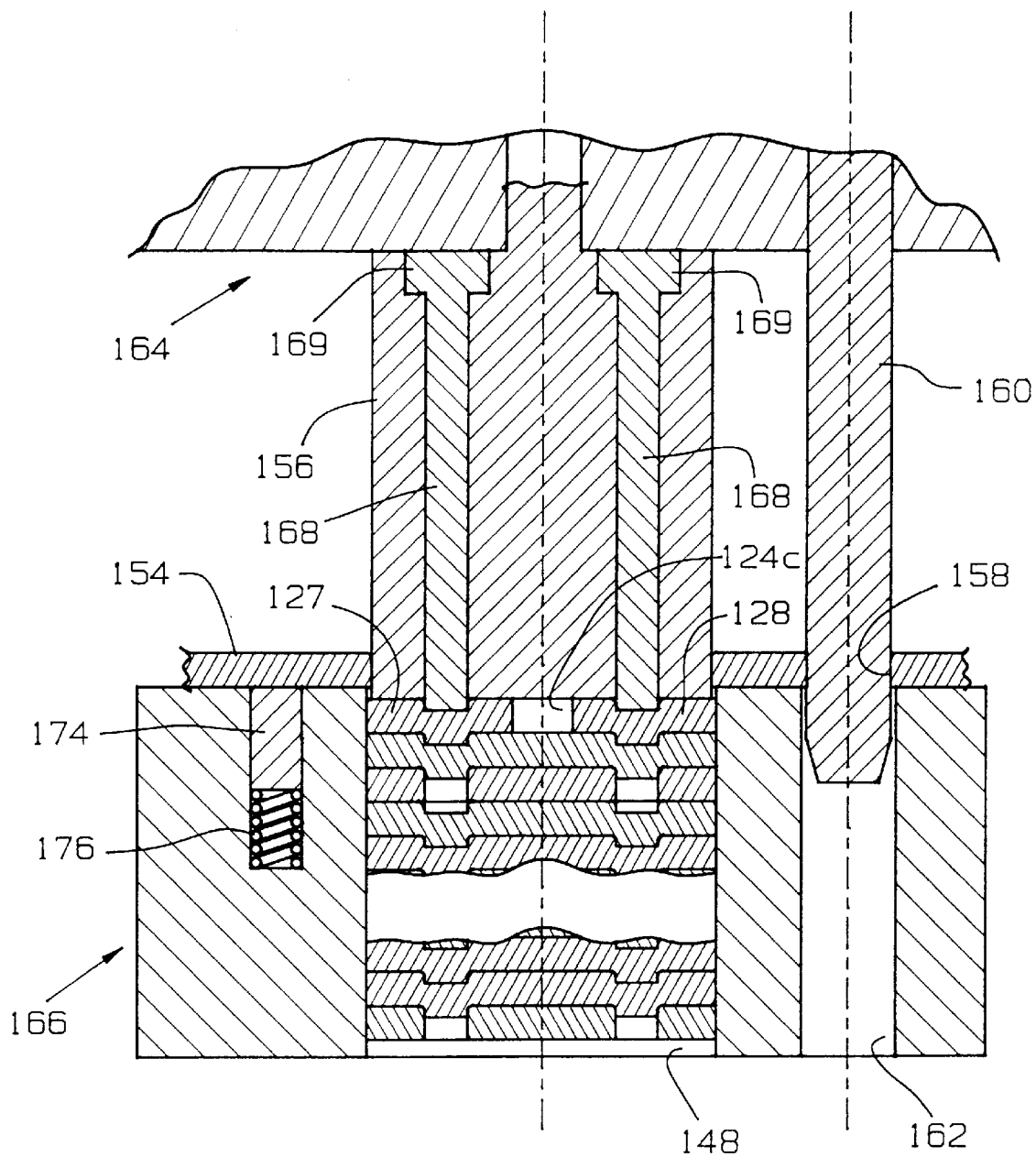
FIG. 17 is a schematic cross sectional view of the blanking punch of FIG. 14 separating the discrete lamina segments from the strip stock material.

Distance 178 is determined by the distance blanking punch 156 enters choke barrel 148 at the end of the die assembly downstroke as shown schematically in FIG. 17. Punch entry distance 178 is typically greater than the thickness 173 of the strip stock material in conventional die assemblies. For example, for a strip stock thickness 173 equivalent to 0.025 inch, a conventional die assembly would often have a punch entry between 0.030 and 0.035 inch.

The present invention, however, utilizes a much smaller punch entry which ensures that interlock tabs 144 of the blanked lamina layer are engaged with the uppermost lamina layer in the choke barrel prior to completely severing the lamina layer being blanked. For example, by utilizing a distance 178 which is smaller than distance 172, tabs 144b will be partially interlocked with slots 146u when the die assembly reaches the position shown in FIG. 15. Alternatively, distance 178 can be equivalent to distance 170 as shown in FIGS. 14–17 and interlock tabs 144b will be engaged with slots 146u as the lamina layer being blanked is being severed from the strip stock material 154 but prior to complete separation as shown in FIG. 16. It may also be possible to have a distance 178 slightly larger than distance 170 and still provide for the partial interlocking of tabs 144b and slots 146u prior to complete separation of the lamina layer. The partial interlocking in such an arrangement, however, would be minimal.

When a plurality of discrete lamina segments are used to form a single lamina layer, the pressure exerted against each common choke surface 150 by the alignment surfaces of choke barrel 148 will not necessarily be counterbalanced by a force created by an opposing alignment surface. Interlock tabs 144, however, are disposed near common choke surfaces 150 and provide resistance to the pressure exerted by the alignment surfaces and thereby maintain discrete lamina segments in an aligned position. Placing interlock tabs 144 near common choke surfaces 150 also minimizes any bowing or distortion of the lamina by limiting the area of the lamina which is stressed by the pressure applied by the alignment surfaces.

The blanking punch 156 severs the material bridges which connect lamina segments 122, 124 to the remainder of strip stock material 154 in cooperation with cutting edges on the upper lip of choke barrel 148. Typically, after blanking punch 156 has sheared the lamina layer to a depth which is approximately ⅓ of the lamina thickness, the lower ⅔ of the strip stock material will fracture and the lamina layer will be completely separated from the strip stock material. The use of a softer, more elastic strip stock material, however, would permit the blanking punch to enter the strip stock material for more than ⅓ of the lamina thickness and produce a lamina with a smaller fracture zone. As discussed above, the proper alignment of discrete lamina segments 122, 124 is maintained by engagement of interlock tabs 144b prior to the fracturing of the strip stock material attaching discrete lamina segments 122, 124 to the remainder of strip stock material 154.

The downstroke is finished by pushing discrete lamina segments 122, 124 into further engagement with the uppermost lamina in choke barrel 148 and pushing lamina segments 122, 124 to a depth 178 below the upper surface of lower die bed 166 as schematically illustrated in FIG. 17. After blanking punch 156 is retracted, stock lifters 74 elevate strip stock material 154, strip stock material 154 is advanced within the die assembly, and the stamping cycle is repeated. A die assembly embodying the present invention may be operated at speeds which are typical for embodying the present invention may be operated at speeds which are typical for interlocked laminas, e.g., 300 strokes per minute. The maximum speed of operation of any particular die assembly is dependent upon a number of different variables relating to the complexity of the die assembly and the material handling requirements imposed upon the die assembly by the dimensions and configuration of the lamina stack being manufactured. For most lamina stack and die assembly designs, however, the stamping and stacking of two discrete lamina segments to form a single layer in a lamina stack should not, by itself, have a direct impact upon the speed at which individual die assemblies are operated.

The ability to automatically stamp and stack a plurality of laminas which include a lamina layer formed by a plurality of discrete lamina segments permits the economical manufacture of parts which might otherwise be more expensively manufactured from a single layer of material. For example, the ability to stack lamina layers having a plurality of discrete lamina segments permits the manufacture, in a single operation, of laminated parts wherein a plurality of apertures or other discontinuities are located in the part so as to prevent the use of an integral lamina for one or more layers of the stack. Conventional manufacture of such parts often involves the stamping of a single, relatively thick, material layer and forming the apertures or other discontinuities with secondary operations such as drilling or milling. Additionally, as described in greater detail below, a higher quality stamped edge can be realized by utilizing a plurality of laminas instead of stamping a single thick material layer.

FIGS. 18 and 19 schematically, and in exaggerated fashion for the sake of clarity, illustrate edges which have been sheared by a stamping process. With reference to thick material 180, the process of stamping a part from a sheet of stock material with blanking punch 156 will be described in greater detail. When punch 156 first engages the material, the material will deform plastically before it is sheared. The initial plastic deformation results in rounded corner 182. The material will then be sheared by the penetration of the punch until the lower portion of the strip stock material fractures. Typically, the punch will penetrate approximately ⅓ of the lamina thickness before the lower ⅔ of the lamina fractures. This leaves a relatively smooth shear cut band 184, marked by cross hatching, and a rougher fracture zone 186. Thin laminas 190 shown in FIG. 19 have rounded corners 192, shear cut bands 194 and fracture zones 196 on their cut edges which are proportionally similar to those of thick material 180, e.g., shear band 194 is approximately ⅓ the thickness of the lamina material. Although proportional, the magnitude of the individual edge depressions which are located in the fracture zone 196 of the thinner laminas 190 are smaller than the depressions located in fracture zone 186 of thick material 180. The rounded edge depression 182 shown in FIG. 19 is also smaller than the depression 192 shown in FIG. 18. Thus, by utilizing a plurality of thinner laminas 190 instead of thick material 180, one can manufacture a part having an edge wherein the magnitude of the roughness is reduced and the clean shear cut band is more evenly distributed. For example, a clutch plate having the form of a splined disk could be formed by stamping and stacking ten 0.025 inch laminas to thereby provide a higher quality edge surface than a single 0.25 inch layer of stamped material.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing a laminated stack in a die assembly having means for guiding sheet stock material through the die assembly, stamping means and a choke barrel, said method comprising:
   a first step of stamping a first lamina in the sheet stock material, said first lamina being unitary, stamping a plurality of first interlock means for engaging another lamina in said first lamina, and placing said first lamina in the choke barrel;
   a second step of stamping features in the sheet stock material, said features defining a second lamina comprised of a plurality of discrete segments connected to a carrier portion of the sheet stock material, each of said discrete segments including a second interlock means for interlocking each of said discrete segments with one of said first interlock means;
   a third step of at least partially engaging said second interlock means in said discrete segments with said first interlock means in the first lamina positioned in the choke barrel; and
   a fourth step of separating said discrete segments from said carrier portion substantially simultaneously with said third step.

2. The method of manufacturing a laminated stack according to claim 1 further comprising a fifth step of forcing said discrete segments into complete interlocking engagement with said first lamina after said third step.

3. The method of manufacturing a laminated stack according to claim 1 wherein said second interlock means in said discrete segments comprise extending tabs and the first interlock means comprise interlock slots.

4. The method of manufacturing a laminated stack according to claim 3 wherein said tabs extend from the strip stock material a first distance and said first step further comprise positioning said first lamina within the choke barrel a second distance from an upper surface of the choke barrel prior to said third step, said second distance equal to or less than said first distance.

5. The method of manufacturing a laminated stack according to claim 3 wherein said discrete segments each include an outside edge defining a choke being disposed near said interlock tabs whereby pressure exerted on said choke surfaces is transferred to said interlock tabs.

6. A method of manufacturing a laminated stack in a die assembly having means for guiding sheet stock material through the die assembly, stamping means and a choke barrel; said method comprising:
   a first step of stamping features in the sheet stock material, said features defining a plurality of laminas, each of said laminas having an outer edge and a plurality of interlock means for engaging another lamina, each of said edges defining one of a plurality of lamina configurations, a portion of each of said edges comprising a choke surface, at least one of said laminas comprising a unitary lamination, one of said laminas comprising a plurality of discrete lamina segments connected to a carrier portion of a sheet stock material, each of said discrete lamina segments including one of said interlock features;

a second step of at least partially engaging said interlock features of said discrete segments with cooperating interlock means disposed on an uppermost one of said laminas positioned in the choke barrel; and a third step of separating said discrete segments from the carrier portion of the sheet stock material substantially simultaneously with said third step; and a fourth step of stacking said laminas in the choke barrel by aligning said choke surfaces in registry with an alignment element to thereby form a laminated stack.

7. A method of manufacturing a laminated stack in a die assembly, said die assembly having means for guiding sheet stock material through the die assembly, stamping means, and a choke barrel, said method comprising;

a first step of stamping a first lamination from said sheet stock material, said first lamination comprised of a plurality of discrete segments, each said segments including first interlock means;

a second step of stamping a second lamination from said sheet stock material, said second lamination being unitary and including second interlock means for interlocking said first lamination to said second lamination to form a laminated stack;

a third step of stacking said first and second laminations in said choke barrel and interlocking said second lamination with said first lamination.

8. A method of manufacturing a laminated stack in a die assembly having means for guiding sheet stock material through the die assembly, stamping means, and a choke barrel, said method comprising;

a first step of stamping a first lamina in the sheet stock material, stamping a first interlock means in said first lamina, and placing said first lamina in the choke barrel;

a second step of stamping features in the sheet stock material, said features defining a second lamina having a discontinuous, said discontinuous outer perimeter defining a gap in said outer perimeter, said second lamina including second interlock means for interlocking with said first interlock means, said second and said first lamina having different outer perimeter configurations; and a third step of interlocking said second interlock means with said first interlock means.

9. A method of manufacturing a laminated stack in a die assembly having means for guiding sheet stock material through the die assembly, stamping means, and a choke barrel, said method comprising:

a first step of stamping a first lamina in the sheet stock material, stamping a first interlock means in said first lamina, and placing said first lamina in the choke barrel;

a second step of stamping features in sheet stock material, said features defining a second, generally U-shaped lamina, said second lamina including second interlock means for interlocking with said first interlock means, said second lamina and said first lamina having different outer perimeter configurations; and a third step of interlocking said second interlock means with said first interlock means.

10. A method of manufacturing a laminated stack in a die assembly having means for guiding sheet stock material through the die assembly, stamping means, and a choke barrel, said method comprising:

a first step of stamping a first lamina in the sheet stock material, stamping a first interlock means in said first lamina, and placing said first lamina in the choke barrel;

a second step of stamping features in the sheet stock material, said features defining a second lamina, said second lamina including second interlock means for interlocking with said first interlock means;

a third step of at least partially engaging said second interlock means with said first interlock means; and a fourth step of separating said second lamina from said sheet stock material after said third step.

11. A method of manufacturing a laminated stack in a die assembly having means for guiding sheet stock material through the die assembly, stamping means, and a choke barrel, said method comprising:

a first step of stamping a first lamina into sheet stock material, stamping a first interlock means for engaging another lamina, and placing said first lamina in the choke barrel;

a second step of stamping features in the sheet stock material, said features defining a second lamina, said second lamina including second interlock means for interlocking with said first interlock means, said first lamina and said second lamina having different outer perimeter configurations;

a third step of at least partially engaging said second interlock means with said first interlock means; and a fourth step of separating said second lamina from said sheet stock material after said third step.

12. A method of manufacturing a laminated stack in a die assembly having means for guiding sheet stock material through the die assembly, stamping means and a choke barrel; said method comprising:

a first step of stamping features defining a plurality of laminas, each of said laminas having an outer edge, each of said edges defining one of a plurality of lamina configurations, a portion of each of said edges comprising a common choke surface, and at least one of said laminas comprising a plurality of discrete lamina segments connected to a carrier portion of the sheet stock material;

a second step of aligning said discrete segments with an uppermost one of said laminas positioned in the choke barrel; and a third step of separating said discrete segments from the carrier portion of the sheet stock material after said third step;

a fourth step of stacking said laminas in the choke barrel by aligning said common choke surfaces in registry with an alignment element to thereby form a laminated stack; and a fifth step of securing said stacked laminas to each other.

13. A method of manufacturing a laminated stack in a die assembly, said die assembly having means for guiding sheet stock material through the die assembly, stamping means, and a choke barrel, said method comprising;

a first step of stamping a first lamination from said sheet stock material, said first lamination comprised of a plurality of discrete segments, each said segments including an alignment element;

a second step of stamping a second lamination from said sheet stock material, said second lamination being unitary;

a third step of stacking said first and second laminations in said choke barrel and for aligning said second lamination with said first lamination; and a fourth step of securing said stacked laminations to each other.

14. A method of manufacturing a laminated stack in a die assembly having means for guiding sheet stock material through the die assembly, stamping means, and a choke barrel, said method comprising:

- a first step of stamping a first lamina into sheet stock material, stamping a first alignment element, and placing said first lamina in the choke barrel;
- a second step of stamping features in the sheet stock material, said features defining a second lamina, said second lamina including a second alignment element for engaging with said first alignment element, said first lamina and said second lamina having different outer perimeter configurations;
- a third step of aligning and stacking said first and second laminas;
- a fourth step of separating said second lamina from said sheet stock material after said third step; and
- a fifth step in securing said stacked laminas to each other.

* * * * *

UNITED STATES PATENT AND TRADEMARK OFFICE
CERTIFICATE OF CORRECTION

| | | |
|---|---|---|
| PATENT NO. | : 6,131,268 | Page 1 of 1 |
| APPLICATION NO. | : 08/963795 | |
| DATED | : November 4, 1997 | |
| INVENTOR(S) | : Thomas R. Neuenchwander | |

It is certified that error appears in the above-identified patent and that said Letters Patent is hereby corrected as shown below:

In Claim 6, Column 19, Line 7, change "third" to "second"

In Claim 8, Column 19, Line 36, after discontinuous (first instance), add "outer perimeter"

In Claim 12, Column 20, Line 45 change "third" to "second"

In Claim 13, Column 20, Line 58 change "segments" to "segment"

In Claim 13, Column 20, Line 64, delete the word "for"

Signed and Sealed this
Nineteenth Day of June, 2012

David J. Kappos
*Director of the United States Patent and Trademark Office*